US008855138B2

(12) United States Patent
Horn et al.

(10) Patent No.: US 8,855,138 B2
(45) Date of Patent: Oct. 7, 2014

(54) RELAY ARCHITECTURE FRAMEWORK

(75) Inventors: Gavin B. Horn, La Jolla, CA (US);
Kalle Ahmavaara, San Diego, CA (US);
Parag A. Agashe, San Diego, CA (US);
Osok Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 948 days.

(21) Appl. No.: 12/546,515

(22) Filed: Aug. 24, 2009

(65) Prior Publication Data

US 2010/0046418 A1 Feb. 25, 2010

Related U.S. Application Data

(60) Provisional application No. 61/091,659, filed on Aug. 25, 2008.

(51) Int. Cl.
*H04J 3/16* (2006.01)
(52) U.S. Cl.
USPC ............................. 370/466; 370/331; 370/401
(58) Field of Classification Search
USPC .......... 370/315, 319, 320, 321, 322, 338, 400
See application file for complete search history.

(56) References Cited

U.S. PATENT DOCUMENTS

| 7,292,188 B2 | 11/2007 | Rowitch |
| 2002/0159409 A1 | 10/2002 | Wolfe et al. |
| 2006/0139869 A1* | 6/2006 | Matusz ........................ 361/685 |
| 2007/0213060 A1 | 9/2007 | Shaheen |
| 2008/0080399 A1* | 4/2008 | Wang et al. .................... 370/254 |
| 2009/0201878 A1* | 8/2009 | Kotecha et al. ............... 370/331 |

FOREIGN PATENT DOCUMENTS

| EA | 006841 B1 | 4/2006 |
| RU | 2331985 C2 | 8/2008 |
| WO | WO-0167625 A1 | 9/2001 |
| WO | WO-2006039435 A1 | 4/2006 |
| WO | 2006088105 A1 | 8/2006 |

OTHER PUBLICATIONS

"3rd Generation Partnership Project: Technical Specification Group Core Network and Terminals; 3GPP Evolved Packet System," Evolved GRS Tunnelling Protocol for EPS (GTPv2); Stage 3 (Release 8), 3GPP Standard; 3GPP TS 29.274, 3rd Generation Partnership Project (3GPP) Mobile Competence Centre, May 1, 2008.

(Continued)

*Primary Examiner* — Dady Chery
(74) *Attorney, Agent, or Firm* — Michael J. DeHaemer, Jr.

(57) ABSTRACT

Systems and methodologies are described that facilitate providing relay nodes in wireless networks. In particular, cluster nodes, which can be regular eNBs, can provide wireless network access to the relay nodes over a backhaul link, and the relay nodes can offer access to devices or other relay nodes to expand network coverage and/or provide increased throughput. User equipment (UE) relays can function as UEs according to a cluster node such that UE relays receive network addressing and can tunnel communications through the cluster node using the backhaul link. Cell relays can function as a cell of the cluster node, such that transport layer communications terminate at the cluster node. In this regard, cell relays can define transport layers to use in communicating with the cluster nodes over the backhaul and with other devices over a provided access link.

124 Claims, 22 Drawing Sheets

(56) References Cited

OTHER PUBLICATIONS

"A discussion on some technology components for LTE-Advanced" 3GPP Draft; R1-082024 (LTE-Advanced Technology Components), 3rd Generation Partnership Project (3GPP), Mobile Competence Centre; 650, Route Des Lucioles; F-06921 Sophia-Antipolis Cedex; France, vol. RAN WGI, No. Kansas City, USA; May 14, 2008, XP050110365, the whole document.
Ericsson: "Self Backhauling and Lower Layer Relaying," 3GPP Draft, 3rd Generation Partnership Project, Jun. 24, 2008.
Ericsson: "TP to 36.912 on Relaying," 3GPP Draft; 3rd Generation Partnership Project, Aug. 20, 2009.
International Search Report—PCT/US2009/054958—International Search Authority—European Patent Office, Apr. 8, 2010.
"LTE-A RAN3 Baseline Document" 3GPP Draft; R3-091447, SRD Generation Partnership Project (3GPP), Mobile Competence Centre; 650, Route Des Lucioles; F-06921 Sophia-Antipolis Cedex; France, No. San Francisco, USA; May 9, 2009, XP050341769 [retrieved on May 9, 2009] the whole document.
Motorola: "Classification of Relays," 3GPP Draft; R1-083223—Relay Classification, 3rd Generation Partnership Project (3GPP), Mobile Competence Centre, Aug. 12, 2008.
Panasonic: "Discussion on the Various Types of Relays," 3GPP Draft, 3rd Generation Partnership Project, Jun. 24, 2008.
Panasonic: "Text Proposal of Relaying Functionality for TR on LTE-Advanced," 3GPP Draft, 3rd Generation Partnership Project, Aug. 12, 2008.
Qualcomm Europe: "Operation of Relays in LTE-A," 3GPP Draft, 3rd Generation Partnership Project, Aug. 12, 2008.
Written Opinion—PCT/US2009/054958, International Search Authority, European Patent Office, Mar. 1, 2011.
Taiwan Search Report—TW098128537—TIPO—Jun. 21, 2013.
Taiwan Search Report—TW098128537—Tipo—Dec. 11, 2013.

\* cited by examiner

RELAY ARCHITECTURE FRAMEWORK

CLAIM OF PRIORITY UNDER 35 U.S.C. §119

The present Application for Patent claims priority to Provisional Application No. 61/091,659 entitled "RELAY ARCHITECTURE FRAMEWORK" filed Aug. 25, 2008, and assigned to the assignee hereof and hereby expressly incorporated by reference herein.

BACKGROUND

1. Field

The following description relates generally to wireless communications, and more particularly to architectures for relaying communications in a wireless network.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. Access points, however, can be limited in geographic coverage area as well as resources such that mobile devices near edges of coverage and/or devices in areas of high traffic can experience degraded quality of communications from an access point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating relaying communications between devices in a wireless communications network to provide extended coverage and/or increased throughput. For example, cluster nodes are provided that can each communicate with a plurality of relay nodes to provide access to a core network. In addition, relay nodes can communicate with cluster nodes over a backhaul link to provide access to one or more mobile devices, other relay nodes, etc. In one example, relay nodes can communicate with cluster nodes as mobile devices such that the relay nodes can be assigned an internet protocol (IP) address from a core network via the cluster node, and thus transport layer communications are tunneled through the cluster node. In another example, relay nodes can communicate with cluster nodes as a cell relay such that transport layer communications terminate at the cluster node, and the cluster node forwards application layer communications to the relay node over a disparate transport layer protocol.

According to related aspects, a method is provided that includes communicating with a relay eNB over an LTE backhaul link and receiving communications related to the relay eNB over one or more backhaul link protocols from one or more network components. The method also includes transmitting the communications to the relay eNB over the LTE backhaul link using one or more disparate protocols.

Another aspect relates to a wireless communications apparatus. The wireless communications apparatus can include at least one processor configured to provide an LTE backhaul link for communicating with a relay eNB. The at least one processor is further configured to obtain communications for the relay eNB from one or more network components over a backhaul link protocol and transmit the communications to the relay eNB over the LTE backhaul link using a disparate backhaul link protocol. The wireless communications apparatus also comprises a memory coupled to the at least one processor.

Yet another aspect relates to an apparatus. The apparatus includes means for receiving communications related to a relay eNB over one or more backhaul link protocols from one or more network components and means for transmitting the communications to the relay eNB over an LTE backhaul link using one or more disparate backhaul link protocols.

Still another aspect relates to a computer program product, which can have a computer-readable medium including code for causing at least one computer to communicate with a relay eNB over an LTE backhaul link. The computer-readable medium can also comprise code for causing the at least one computer to receive communications related to the relay eNB over one or more backhaul link protocols from one or more network components and code for causing the at least one computer to transmit the communications to the relay eNB over the LTE backhaul link using one or more disparate protocols.

Moreover, an additional aspect relates to an apparatus including a backhaul link component that receives communications related to a relay eNB over one or more backhaul link protocols from one or more network components. The apparatus can further include an access link component that transmits the communications to the relay eNB over an LTE backhaul link using one or more disparate backhaul link protocols.

According to other aspects, a method is provided that includes receiving an IP address from a network component through a donor eNB. The method further includes receiving one or more packets from the network component through the donor eNB based on the IP address and transmitting information from the one or more packets to a UE or a disparate relay eNB.

Another aspect relates to a wireless communications apparatus. The wireless communications apparatus can include at least one processor configured to obtain an IP address from a serving gateway via a donor eNB and communicate with the serving gateway through the donor eNB to receive one or more packets based at least in part on the IP address. The at least one processor is further configured to transmit content from the one or more packets to a UE or a disparate relay eNB. The wireless communications apparatus also comprises a memory coupled to the at least one processor.

Yet another aspect relates to an apparatus. The apparatus includes means for receiving an IP address from a network component through a donor eNB and means for receiving one or more packets from the donor eNB originating at the network component based on the IP address. The apparatus further includes means for transmitting information from the one or more packets to a UE or a disparate relay eNB.

Still another aspect relates to a computer program product, which can have a computer-readable medium including code for causing at least one computer to receive an IP address from a network component through a donor eNB and code for causing the at least one computer to receive one or more packets from the network component through the donor eNB based on the IP address. The computer-readable medium can also comprise code for causing the at least one computer to transmit information from the one or more packets to a UE or a disparate relay eNB.

Moreover, an additional aspect relates to an apparatus including an address receiving component that obtains an IP address from a network component through a donor eNB. The apparatus can further include a backhaul link component that receives one or more packets from the donor eNB originating at the network component based on the IP address and an access link component that transmits information from the one or more packets to a UE or a disparate relay eNB.

In another aspect, a method is provided that includes receiving a connection establishment request from a relay eNB. The method also includes assigning a local IP address to the relay eNB to optimize routing of data received from a network to the relay eNB and transmitting the local IP address to the relay eNB.

Another aspect relates to a wireless communications apparatus. The wireless communications apparatus can include at least one processor configured to obtain a connection establishment request from a relay eNB and allocate a local IP address to the relay eNB to optimize routing of data received from a network to the relay eNB. The at least one processor is further configured to provide the local IP address to the relay eNB. The wireless communications apparatus also comprises a memory coupled to the at least one processor.

Yet another aspect relates to an apparatus. The apparatus includes means for receiving a connection establishment request from a relay eNB and means for assigning a local IP address to the relay eNB to optimize routing of data received from a network to the relay eNB, wherein the means for receiving the connection establishment request transmits the local IP address to the relay eNB.

Still another aspect relates to a computer program product, which can have a computer-readable medium including code for causing at least one computer to receive a connection establishment request from a relay eNB. The computer-readable medium can also comprise code for causing the at least one computer to assign a local IP address to the relay eNB to optimize routing of data received from a network to the relay eNB and code for causing the at least one computer to transmit the local IP address to the relay eNB.

Moreover, an additional aspect relates to an apparatus including an access link component that receives a connection establishment request from a relay eNB. The apparatus can further include an addressing component that assigns a local IP address to the relay eNB to optimize routing of data received from a network to the relay eNB, wherein the access link component transmits the local IP address to the relay eNB.

According to further aspects, a method is provided that includes receiving information related to a relay eNB in one or more application protocols over a transport layer from a network component. The method also includes decoupling the one or more application protocols from the transport layer and transmitting the information in the one or more application protocols over a disparate transport layer to the relay eNB.

Another aspect relates to a wireless communications apparatus. The wireless communications apparatus can include at least one processor configured to receive data related to a relay eNB in an application protocol over a transport layer from a network component and decouple the application protocol from the transport layer. The at least one processor is further configured to send the data in the application protocol over a disparate transport layer to the relay eNB. The wireless communications apparatus also comprises a memory coupled to the at least one processor.

Yet another aspect relates to an apparatus. The apparatus includes means for receiving a communication related to a relay eNB from a network component and means for decoupling application layer data from a transport layer of the communication. The apparatus can further include means for transmitting the application layer data to the relay eNB over a disparate transport layer.

Still another aspect relates to a computer program product, which can have a computer-readable medium including code for causing at least one computer to receive information related to a relay eNB in one or more application protocols over a transport layer from a network component. The computer-readable medium can also comprise code for causing the at least one computer to decouple the one or more application protocols from the transport layer and code for causing the at least one computer to transmit the information in the one or more application protocols over a disparate transport layer to the relay eNB.

Moreover, an additional aspect relates to an apparatus including a backhaul link component that receives a communication related to a relay eNB from a network component and a transport translating component that decouples application layer data from a transport layer of the communication. The apparatus can further include an access link component that transmits the application layer data to the relay eNB over a disparate transport layer.

In yet another aspect, a method is provided that includes receiving data according to a backhaul link protocol from a donor eNB over an LTE air interface using a compressed transport layer. The method further includes determining the backhaul link protocol based at least in part on the compressed transport layer and processing the data according to the backhaul link protocol.

Another aspect relates to a wireless communications apparatus. The wireless communications apparatus can include at least one processor configured to obtain data from a donor eNB according to a backhaul link protocol over an LTE air interface using a compressed transport layer and discern the backhaul link protocol based at least in part on the compressed transport layer. The at least one processor is further configured to decode the data according to the backhaul link protocol. The wireless communications apparatus also comprises a memory coupled to the at least one processor.

Yet another aspect relates to an apparatus. The apparatus includes means for receiving data from a donor eNB according to a backhaul link protocol over an LTE air interface using a compressed transport layer. The apparatus also includes means for determining the backhaul link protocol based at least in part on the compressed transport layer and processing the data according to the backhaul link protocol.

Still another aspect relates to a computer program product, which can have a computer-readable medium including code for causing at least one computer to receive data from a donor eNB according to a backhaul link protocol over an LTE air interface using a compressed transport layer. The computer-readable medium can also comprise code for causing the at least one computer to determine the backhaul link protocol based at least in part on the compressed transport layer and code for causing the at least one computer to process the data according to the backhaul link protocol.

Moreover, an additional aspect relates to an apparatus including an access link component that receives data from a donor eNB according to a backhaul link protocol over an LTE air interface using a compressed transport layer. The apparatus can further include a backhaul link component that determines the backhaul link protocol based at least in part on the compressed transport layer and decodes the data according to the backhaul link protocol.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
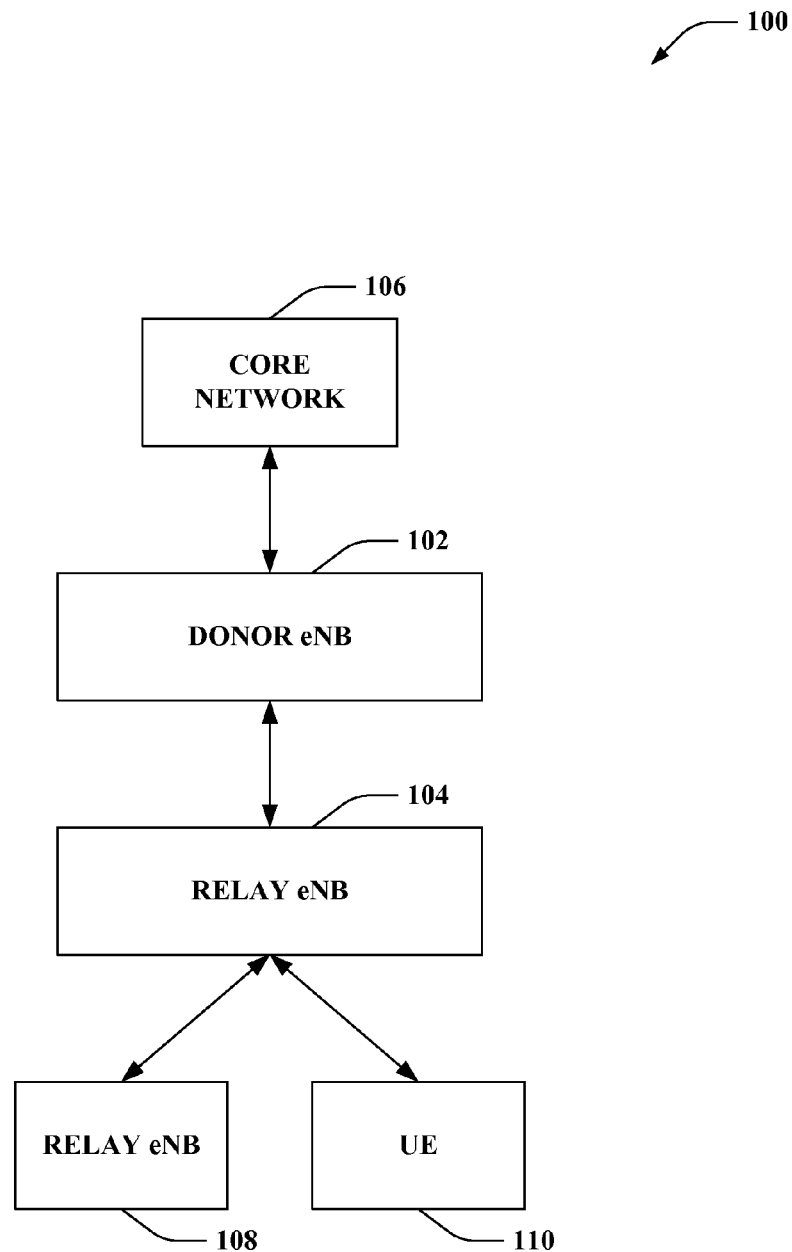
FIG. 1 is an illustration of an example wireless communications system that facilitates providing relays for wireless networks.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 is illustrated that facilitates providing relay functionality in wireless networks. System 100 includes a donor eNB 102 that provides one or more relay eNBs, such as relay eNB 104, with access to a core network 106. Similarly, relay eNB 104 can provide one or more disparate relay eNBs, such as relay eNB 108, or UEs, such as UE 110, with access to the core network 106 via donor eNB 102. Donor eNB 102, which can also be referred to as a cluster eNB, can communicate with the core network 106 over a wired or wireless backhaul link, which can be an LTE or other technology backhaul link. In one example, the core network 106 can be a 3GPP LTE or similar technology network. Donor eNB 102 can additionally provide an access link for relay eNB 104, which can also be wired or wireless, LTE or other technologies, and the relay eNB 104 can communicate with the donor eNB 102 using a backhaul link over the access link of the donor eNB 102. Relay eNB 104 can similarly provide an access link for relay eNB 108 and/or UE 110, which can be a wired or wireless LTE or other technology link. In one example, donor eNB 102 can provide an LTE access link, to which relay eNB 104 can connect using an LTE backhaul, and relay eNB 104 can provide an LTE access link to relay eNB 108 and/or UE 110. Donor eNB 102 can connect to the core network 106 over a disparate backhaul link technology. Relay eNB 108 and/or UE 110 can connect to the relay eNB 104 using the LTE access link to receive access to core network 106, as described. A donor eNB and connected relay eNBs can be collectively referred to herein as a cluster.

According to an example, relay eNB 104 can connect to a donor eNB 102 at the link layer (e.g., media access control (MAC) layer) as would a UE in regular LTE configurations. In this regard, donor eNB 102 can be a regular LTE eNB requiring no changes at the link layer or related interface (e.g. E-UTRA-Uu) to support the relay eNB 104. In addition, relay eNB 104 can appear to UE 110 as a regular eNB at the link layer, such that no changes are required for UE 110 to connect to relay eNB 104 at the link layer, for example. In addition, relay eNB 104 can configure procedures for resource partitioning between access and backhaul link, interference management, idle mode cell selection for a cluster, and/or the like.

With respect to transport layer communications, transport protocols related to relay eNB 108 or UE 110 communications can terminate at the donor eNB 102 or relay eNB 104. In the former case, relay eNB 104 functionality is described herein as a cell relay, since the relay eNB 104 is like a cell of the donor eNB 102. In the latter case, relay eNB 104 functionality is described herein as a UE relay, since the relay eNB 104 is like a UE terminating the transport protocol and tunneling communications through the donor eNB 102. For example, when relay eNB 104 is a cell relay, donor eNB 102 can receive communications for the relay eNB 104 from the core network 106, terminate the transport protocol, and forward the communications to the relay eNB 104 over a disparate transport layer keeping the application layer substantially intact. It is to be appreciated that the forwarding transport protocol type can be the same as the terminated transport protocol type, but is a different transport layer established with the relay eNB 104. Relay eNB 104 can determine a relay eNB or UE related to the communications, and provide the communications to the relay eNB or UE (e.g., based on an identifier thereof within the communications). Similarly, donor eNB 102 can terminate the transport layer protocol for communications received from relay eNB 104, translate the communications to a disparate transport protocol, and transmit the communications over the disparate transport protocol to the core network 106 with the application layer intact for relay eNB 104 as a cell relay. In these examples, where relay eNB 104 is communicating with another relay eNB, the relay eNB 104 can support application protocol routing to ensure communications reach the correct relay eNB.

In another example, relay eNB 104 can terminate the transport layer protocol where the relay eNB 104 is a UE relay. In this example, the relay eNB 104 can be assigned an address (e.g., internet protocol (IP) address) from the core network 106, and the communications from the core network 106 can be tunneled through the donor eNB 102 to the relay eNB 104 (e.g. the donor eNB 102 can forward the communications to the relay eNB 104 based on the address). Relay eNB 104, again, can determine a relay eNB or UE to which the communications relate and provide the communications to the relay eNB or UE (e.g., based on an identifier thereof in the communications). The same can occur for communications from the relay eNB 104 to the core network 106. It is to be appreciated that at each relay eNB, an additional tunnel can be created based on an address assigned by the core network 106.

Moreover, application layer protocols can terminate at upstream eNBs. Thus, for example, application layer protocols for relay eNB 108 and UE 110 can terminate at relay eNB 104, and similarly for relay eNB 104 can terminate at donor eNB 102. The transport and application layer protocols, for example, can relate to S1-U, S1-MME, and/or X2 interfaces. S1-U interface can be utilized to communicate in a data plane between a node and a serving gateway (not shown) of the core network 106. S1-MME interface can be utilized for control plane communications between a node and a mobility management entity (MME) (not shown) of the core network 106. X2 interface can be utilized for communications between eNBs. In addition, for example, donor eNB 102 can communicate with other relay eNBs to allow communications therebetween over the access network (e.g., relay eNB 104 can communicate with one or more additional relay eNBs connected to donor eNB 102).

Figure 2:
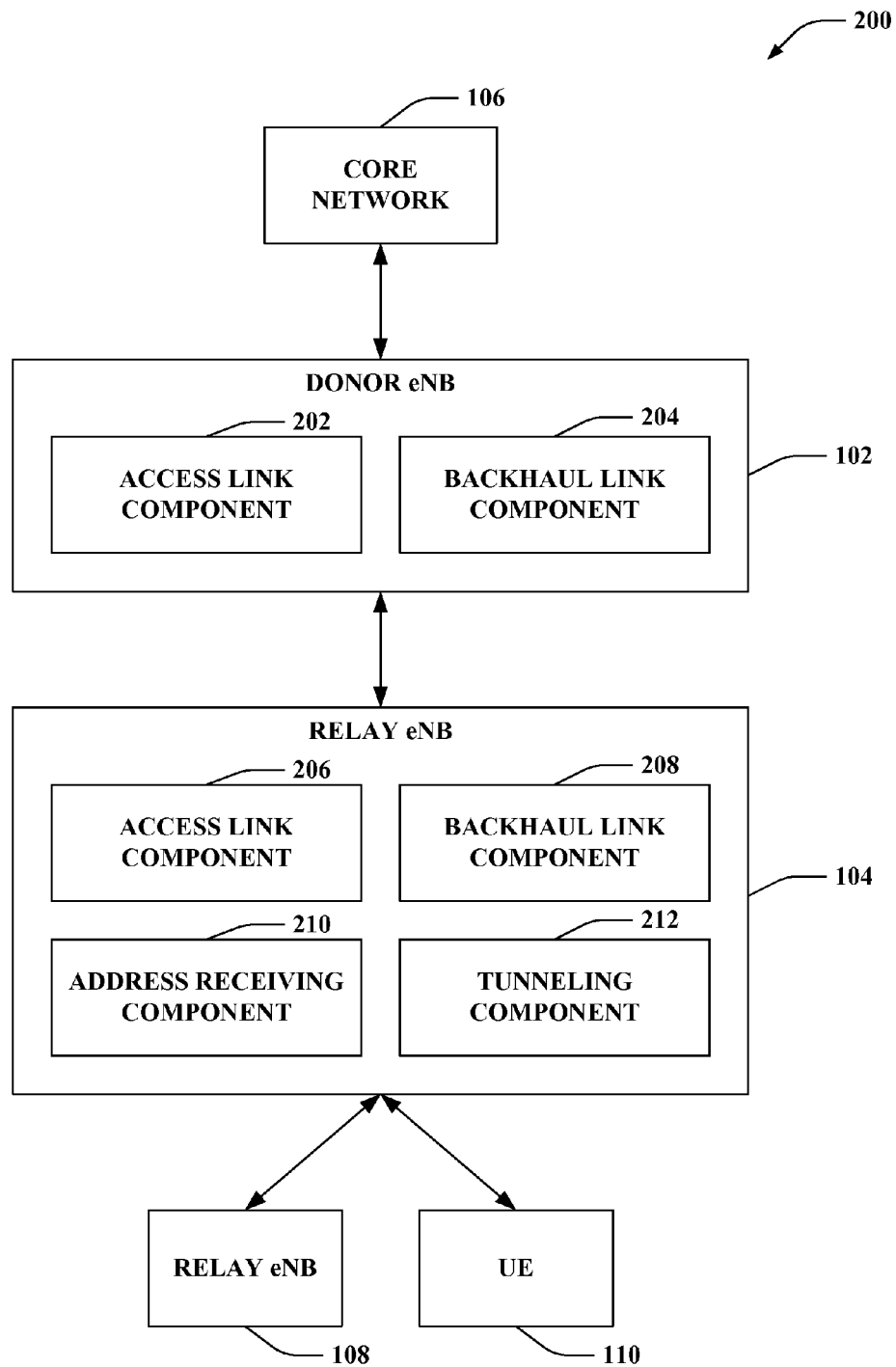
FIG. 2 is an illustration of an example wireless communications system that facilitates communicating with UE relays to provide network access thereto.

Turning now to FIG. 2, an example wireless communication system 200 that facilitates using a UE relay to expand wireless network coverage, increase throughput, and/or the like, is illustrated. System 200 includes a donor eNB 102 that provides relay eNB 104 (and/or other relay eNBs) with access to a core network 106. Additionally, as described, relay eNB 104 can provide relay eNB 108 and/or UE 110 with access to the core network 106 through the donor eNB 102. In addition, it is to be appreciated that relay eNB 108 can comprise the components of relay eNB 104 and provide similar functionality, in one example. In addition, donor eNB 102 can be a macrocell access point, femtocell access point, picocell access point, mobile base station, and/or the like. Relay eNB 104 can similarly be a mobile or stationary relay node that communicates with donor eNB 102 over a wireless or wired backhaul, as described.

Donor eNB 102 comprises an access link component 202 that communicates with one or more downstream nodes, such as relay eNB 104 to provide access to core network 106 and a backhaul link component 204 that communicates with an upstream node, such as one or more components of core network 106, to provide access thereto. Relay eNB 104 similarly comprises an access link component 206 that communicates with one or more downstream nodes to provide access to core network 106 through the donor eNB 102 and a backhaul link component 208 that communicates with the donor eNB to provide the access to the core network 106. In addition, relay eNB 104 can include an address receiving component 210 that obtains a network address, such as an IP address, from one or more components of the core network 106 and a tunneling component 212 that establishes a communications tunnel with the core network 106 based on the network address.

According to an example, relay eNB 104 can establish communications with donor eNB 102 to receive access to the core network 106. In this example, relay eNB 104 can communicate with the donor eNB 102 over its backhaul link component 208, which can provide a wired or wireless link to the access link component 202 of donor eNB 102. In one example, backhaul link component 208 can communicate with the donor eNB 102 using an air interface (such as an LTE air interface). As described, the backhaul link can be an LTE backhaul link, in one example. Donor eNB 102 can communicate with the core network 106 using its backhaul link component 204 to request access for the relay eNB 104. Core network 106 can include one or more components (not shown) to authenticate/authorize the relay eNB 104, such as an MME, policy and charging rules function (PCRF), one or more gateways, and/or the like. Core network 106, and/or one or more components thereof, can assign a network address to the relay eNB 104 and communicate the address to the donor eNB 102 over the backhaul link component 204. Donor eNB 102 can forward the network address communication to the relay eNB 104 over the access link component 202, and backhaul link component 208 can receive the communication. Address receiving component 210 can extract the address from the communication for subsequent use in communicating with the core network 106 via donor eNB 102. This can support mobility for the relay eNB 104, in one example, to seamlessly communicate between multiple donor eNBs.

In an example, tunneling component 212 can establish a communications tunnel with the core network 106 using the network address from address receiving component 210. For example, tunneling component 212 can add a header to, or otherwise wrap, packets before transmitting over the backhaul link component 208 based on the network address; such wrapping can include formatting the packet according to a protocol. In one example, the tunneling component 212 can generate a header to tunnel communications (e.g., a general packet radio service (GPRS) tunneling protocol (GTP)-U/ user datagram protocol (UDP)/IP header for data plane communications, an S1-MME header for control plane communications, etc.) and apply the header to the packet. This can include, for example, inserting the header at the beginning of the packet, creating a new packet with the header and inserting information from the packet into the new packet, and/or the like. In addition, the header can identify the relay eNB 104 according to the network address. In this regard, access link component 202 can receive the packets, and backhaul link component 204 can appropriately forward the packets to the core network 106 (and/or one or more components thereof) based at least in part on the header or other wrapping. In one example, backhaul link component 204 can identify a destination address or component according to the header or wrapping (e.g., based on the protocol or an indicated address) and appropriately forward the packet to the core network 106 or component thereof (such a serving gateway (SGW), public data network (PDN) gateway (PGW), MME, and/or the like). In another example, one or more components of the core network 106 can continue forwarding the packet to the appropriate destination based on information in the header or other packet data. Similarly, core network 106 can generate a response packet, which can be tunneled through the donor eNB 102 to the relay eNB 104 (e.g., by adding a GTP-U/ UDP/IP header or S1-MME header for each hop) based on the assigned network address.

Figure 3:
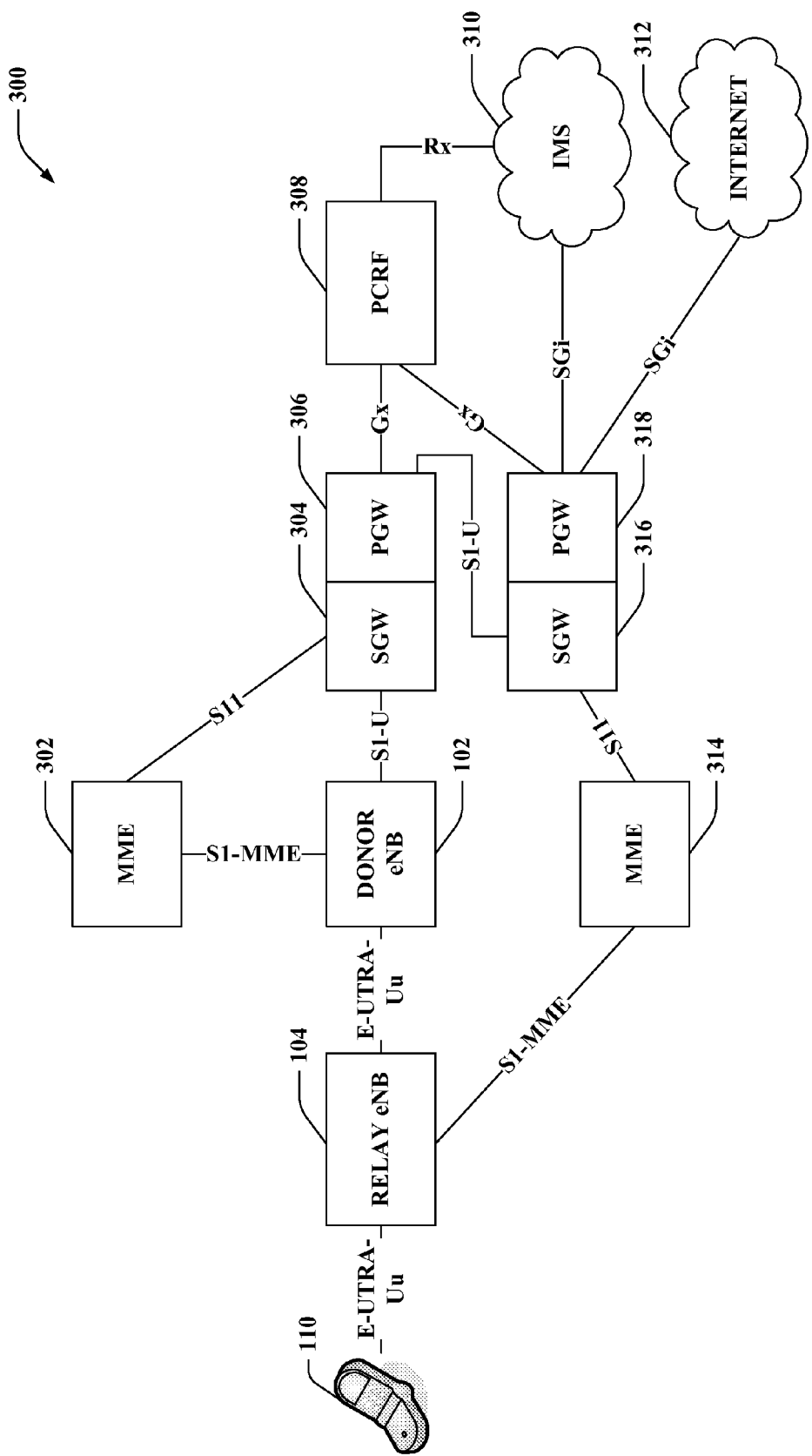
FIG. 3 is an illustration of an example wireless communications system that utilizes UE relays to provide access to a wireless network.

Turning to FIG. 3, an example wireless communication network 300 that provides UE relay functionality is depicted. Network 300 includes a UE 110 that communicates with a relay eNB 104, as described, to receive access to a wireless network. Relay eNB 104 can communicate with a donor eNB 102 to provide access to a wireless network, and as described, donor eNB 102 can communicate with a SGW 304, which can be related to the relay eNB 104. SGW 304 can connect to or be coupled with a PGW 306, which provides network access to SGW 304 and/or additional SGWs. PGW 306 can communicate with a PCRF 308 to authenticate/authorize relay eNB 104 to use the network, which can utilize an IP multi subsystem (IMS) 310 to provide addressing to the relay eNB 104. In addition, SGW 304 can connect to MME 302 to facilitate communication from the relay eNB 104 via donor eNB 102.

According to an example, MME 302, SGW 304, and/or PGW 306 can be related to donor eNB 102 serving substantially all relay eNBs in the cluster. UE 110 can also have an associated SGW 316 and PGW 318, where the PGW 318 provides addressing to the UE 110. PGW 306 can communicate with SGW 316 and PGW 318 to provide such access. Additionally or alternatively, PGW 318 can communicate with PCRF 308 and/or the internet 312 to provide network access. Moreover, for example, SGW 316 can communicate with MME 314, which can be related to UE 110, to facilitate control plane communications from the UE 110. It is to be appreciated that MME 302 and MME 314 can be the same MME, in one example. Similarly, SGW 304 and SGW 316 can be the same SGW, and PGW 306 and PGW 318 can be the same PGW, for example.

In an example, UE 110 can communicate with the relay eNB 104 over an E-UTRA-Uu interface, as described, and the relay eNB 104 can communicate with the donor eNB 102 using an E-UTRA-Uu interface, since the relay eNB 104 functions like a UE at the donor eNB 102. Donor eNB 102 communicates with the MME 302 using an S1-MME interface (e.g., via SGW 304) and the SGW 304 and PGW 306 over an S1-U interface, as depicted. In addition, as shown, MME 302 can communicate with SGW 304, and MME 314 to SGW 316, using an S11 interface. PGWs 306 and 318 can communicate with PCRF 308 over a Gx interface. Furthermore, PCRF 308 can communicate with IMS 310 using an Rx interface, and PGW 318 can communicate with IMS 310 and/or the internet 312 using a SGi interface.

In one example, relay eNB 104 can request access to the wireless network through donor eNB 102. Donor eNB 102 can communicate with SGW 304, which can communicate with PGW 306 to access PCRF 308. As depicted, it is to be appreciated that PGW 306 can access PCRF 308 directly and/or via SGW 316 and PGW 318. PCRF can authenticate/authorize the relay eNB 104, and PGW 306 can assign a network address, such as an IP address, for the relay eNB 104. The network address can be communicated to donor eNB 102, which can communicate the address to relay eNB 104. Using the network address, as described, relay eNB 104 can tunnel data plane communications to the SGW 304 through the donor eNB 102. In this regard, donor eNB 102 can forward packets to the SGW 304 transmitted from the relay eNB 104 and can route packets from the SGW 304 to the relay eNB 104 based on information exposed in the tunneling protocol (such as information in a GTP-U/UDP/IP header) or other information, as described. Thus, the same application protocol (e.g., S1-U application protocol) and/or transport layer protocol can be used from the PGW 306 to the relay eNB 104. In one example, control plane packets for MME 302 can be tunneled through the donor eNB 102 and on to the SGW 304 for forwarding to MME 302 using an S1-MME interface protocol, and packets from the MME 302 for the relay eNB 104 can be forwarded to the SGW 304 and tunneled through the donor eNB 102 to relay eNB 104, as described. UE 110 can similarly receive an address from the PGW 318 and tunnel communications thereto (and/or to MME 314) through the relay eNB 104, donor eNB 102, SGW 304, PGW 306, and SGW 316.

It is to be appreciated that each relay eNB in the path from UE 110 to donor eNB 102, where there are multiple relay eNBs (not shown), can each receive an IP address and accordingly tunnel communications using the address. Thus, communications sent to and from the donor eNB 102 can have multiple headers or wrapping (such as multiple GTP-U/UDP/IP headers), for example. At each hop between eNBs, a header can be added for an upstream packet until it reaches the donor eNB or removed for a downstream packet until it reaches the last eNB. This mitigates the need for UDP/IP routing on backhaul link communications between the various eNBs. In addition, the headers can be compressed for increased throughput and/or security. In yet another example, MME 302, SGW 304 and/or PGW 306 can be implemented within the donor eNB 102, and the donor eNB 102 can assign a local address to the relay eNB 104. This can be referred to as a local breakout configuration. In this example, the PGW 306 can additionally communicate with a home access server (HA)/PGW (not shown), which provides access to the PCRF 308.

Figure 4:
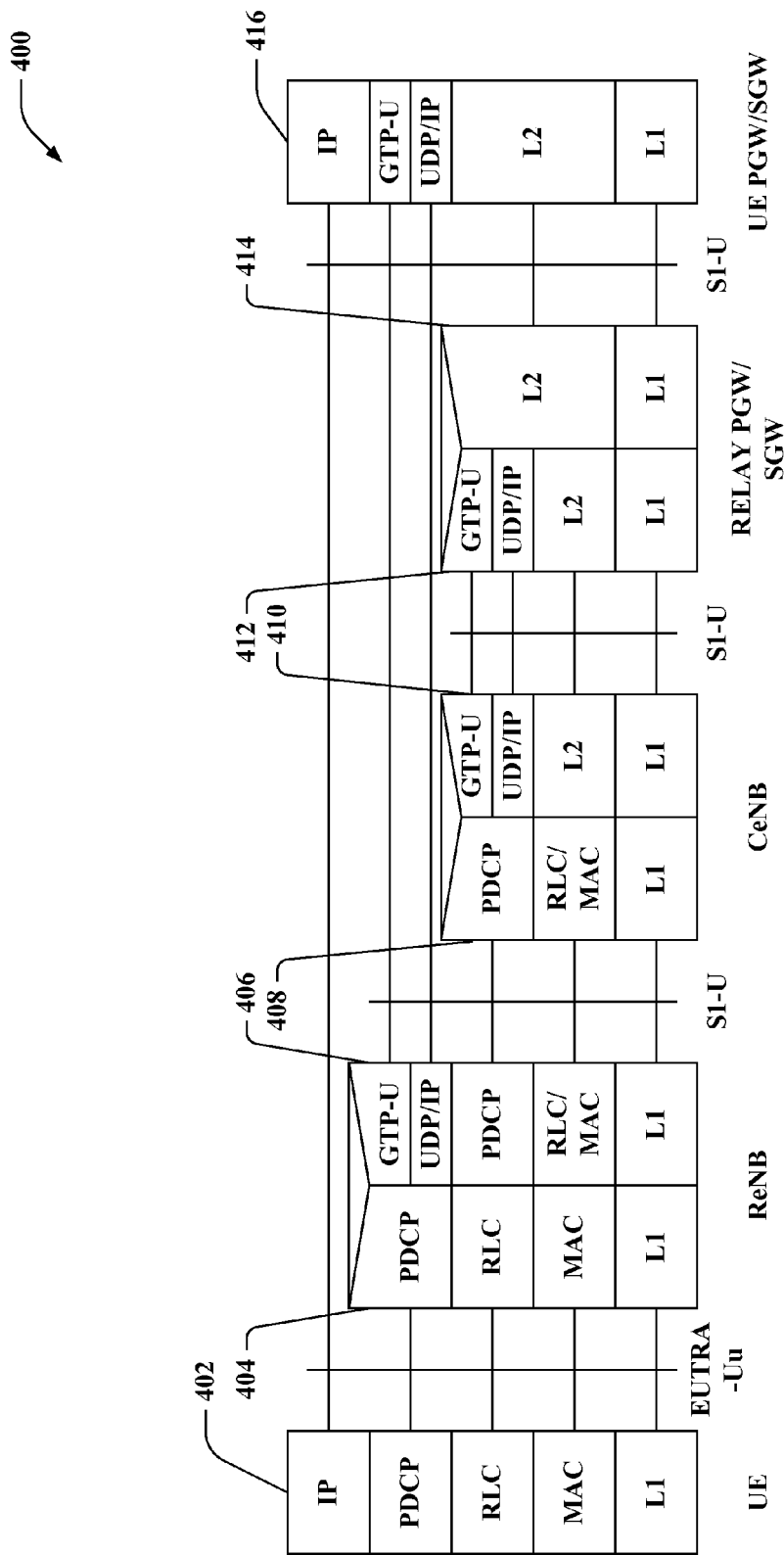
FIG. 4 is an illustration of example protocol stacks that facilitate providing UE relay functionality for data plane communications.

Referring to FIG. 4, example protocol stacks 400 are illustrated that facilitate communicating in a wireless network to provide UE relay functionality for data (e.g., user) plane communications. A UE protocol stack 402 is shown comprising a physical level 1 (L1) layer, a media access control (MAC) layer, a radio link control (RLC) layer, packet data convergence protocol (PDCP) layer, and an IP layer. An ReNB access link protocol stack 404 is depicted having an L1 layer, MAC layer, RLC layer, and PDCP layer, as well as an ReNB backhaul link protocol stack 406 having an L1 layer, RLC/MAC layer, which can be a compressed or combined layer in one example, a PDCP layer, and a GTP-U/UDP/IP layer to support tunneling communications as described. A CeNB access link protocol stack 408 is also shown having an L1 layer, RLC/MAC layer, and a PDCP layer, as well as a CeNB backhaul link protocol stack 410 having an L1 layer, level 2 physical layer (L2), and another GTP-U/UDP/IP layer. ReNB PGW/SGW access link protocol stack 412 has an L1 layer, an L2 layer, and a GTP-U/UDP/IP layer, and ReNB PGW/SGW backhaul link protocol stack 414 has an L1 layer and an L2 layer. UE PGW/SGW protocol stack 416 has an L1 layer, L2, layer, GTP-U/UDP/IP layer, and an IP layer.

According to an example, a UE can communicate with an ReNB to receive access to a UE PGW/SGW. In this regard, UE can communicate over L1, MAC, RLC, and PDCP layers with the ReNB over using a EUTRA-Uu interface, as shown between protocol stacks 402 and 404. The UE can tunnel IP layer communications through the ReNB and other entities to the UE PGW/SGW, which assigns an IP address to the UE, as shown between protocol stacks 402 and 416. To facilitate such tunneling, the ReNB communicates with a CeNB to obtain access to the UE PGW/SGW that can also assign an IP address to the ReNB. In this regard, ReNB communicates with the CeNB over L1, RLC/MAC, and PDCP layers over an S1-U interface, as shown between protocol stacks 406 and 408, and tunnels IP communications in a GTP-U/UDP/IP layer to the UE PGW/SGW, as shown between protocol stacks 406 and 416. Thus, the GTP, UDP, and IP headers are sent over the backhaul. CeNB then communicates with a relay PGW/SGW over an L1 layer, L2 layer, and GTP-U/UDP/IP layer using an S1-U interface, as shown between protocol stacks 410 and 412 to facilitate tunneling communications between the ReNB and UE PGW/SGW. Relay PGW/SGW can then communicate with UE PGW/SGW over an L1 and L2 layer using an S1-U interface to provide the tunneled communications from the CeNB, as shown between protocol stacks 414 and 416. In this regard, UE PGW/SGW can maintain tunneled IP communications with the UE and ReNB, as described herein. Moreover, for additional hops between ReNBs, a GTP-U/UDP/IP header can be added to route communications from the UE PGW/SGW, since the ReNBs will have assigned IP addresses, as described. In one example, this mitigates the need for UDP/IP routing on the backhaul, the need to define special radio bearers on the backhaul, etc. Moreover, though described in terms of uplink communication, it is to be appreciated that the protocol stack can be used for downlink communications as well.

Figure 5:
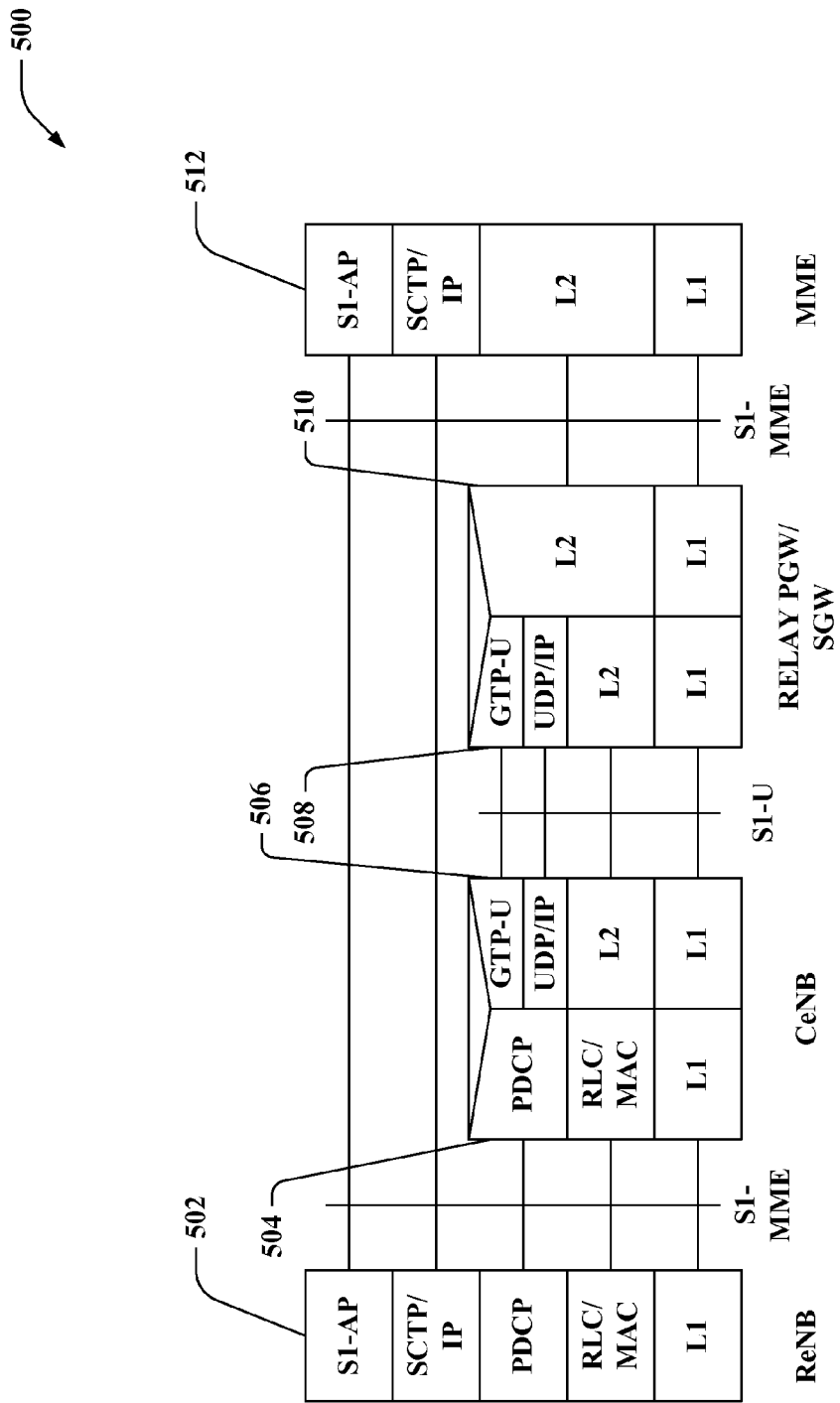
FIG. 5 is an illustration of example protocol stacks that facilitate providing UE relay functionality for control plane communications.

Turning now to FIG. 5, example protocol stacks 500 are illustrated that facilitate communicating in a wireless network to provide UE relay functionality for control plane communications. An ReNB protocol stack 502 is shown comprising an L1 layer, a RLC/MAC layer, a PDCP layer, a stream control transmission protocol (SCTP)/IP layer, and an S1 application protocol (S1-AP) layer. A CeNB access link protocol stack 504 is also shown having an L1 layer, RLC/MAC layer, and a PDCP layer, as well as a CeNB backhaul link protocol stack 506 having an L1 layer, L2 layer, and a GTP-U/UDP/IP layer. ReNB PGW/SGW access link protocol stack 508 has an L1 layer, an L2 layer, and a GTP-U/UDP/IP layer, and ReNB PGW/SGW backhaul link protocol stack 510 has an L1 layer and an L2 layer. MME protocol stack 512 has an L1 layer, L2, layer, SCTP/IP layer, and an S1-AP layer.

According to an example, an ReNB can communicate with a CeNB over an L1 layer, RLC/MAC layer, and PDCP layer using an S1-MME interface, as shown between protocol stacks 502 and 504, to facilitate control plane communications. In this regard, ReNB can tunnel SCTP/IP and S1-AP layers to the MME, as shown between protocol stacks 502 and 512. To facilitate such tunneling, CeNB can communicate with a relay PGW/SGW, as described, over an L1 layer, L2 layer, and GTP-U/UDP/IP layer using an S1-U interface, as shown between protocol stacks 506 and 508. In this regard, CeNB tunnels the S1-AP and SCTP/IP layer communications by establishing a GTP-U/UDP/IP session with the relay PGW/SGW. Relay PGW/SGW can communicate the L1 layer and L2 layer communications with the MME, as shown between protocol stacks 510 and 512. In this regard, MME can maintain tunneled IP communications with the ReNB, as described herein. Moreover, for additional hops between ReNBs, a GTP-U/UDP/IP header can be added to route communications from the UE PGW/SGW, since the ReNBs will have assigned IP addresses, as described. In one example, this mitigates the need for UDP/IP routing on the backhaul, the need to define special radio bearers on the backhaul, etc. Moreover, though described in terms of uplink control plane communication, it is to be appreciated that the protocol stack can be used for downlink control plane communications as well.

Figure 6:
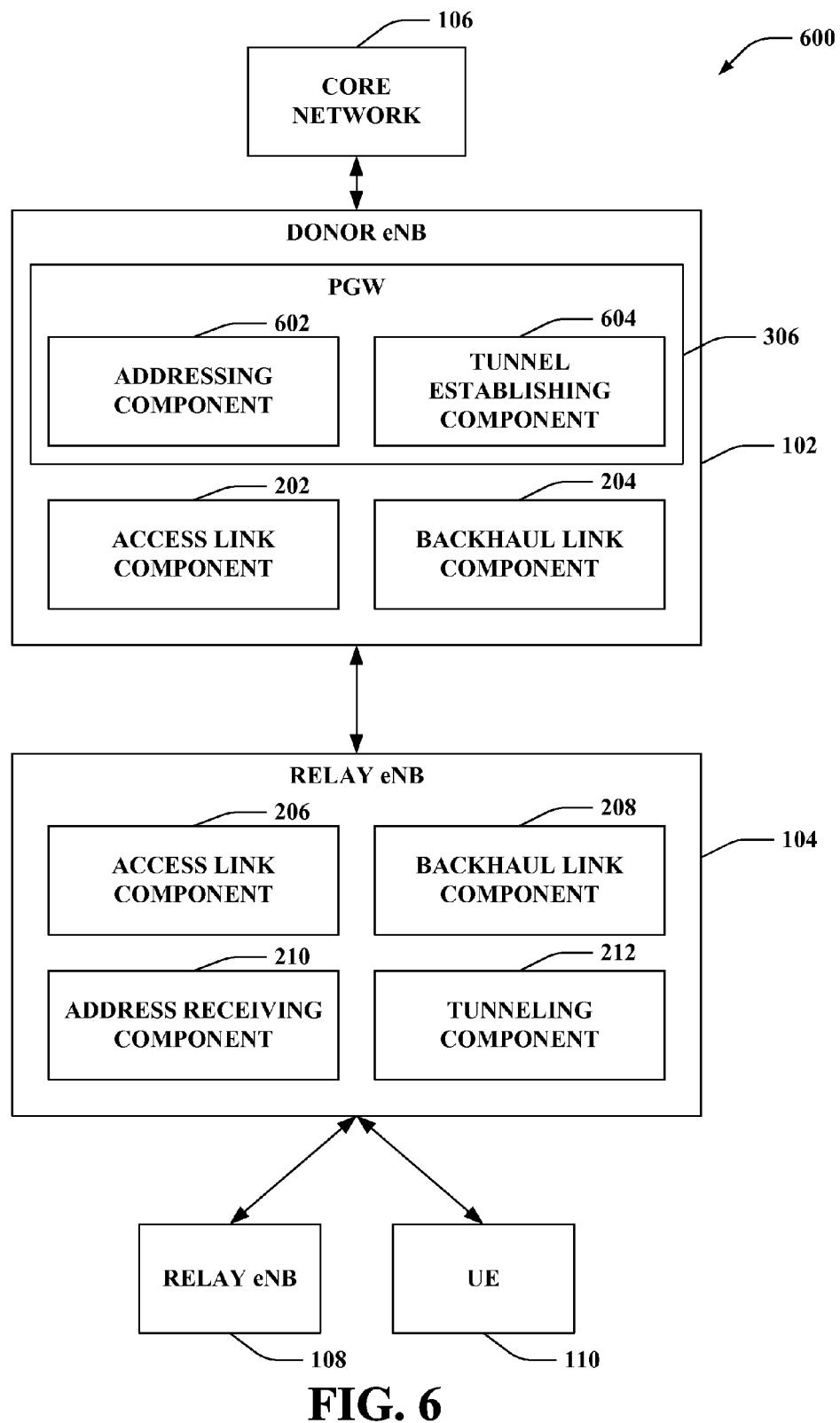
FIG. 6 is an illustration of an example wireless communications system that facilitates communicating with UE relays in a local breakout configuration.

Turning now to FIG. 6, an example wireless communication system 600 that facilitates using a UE relay to expand wireless network coverage, increase throughput, and/or the like, in a local breakout configuration is illustrated. System 600 includes a donor eNB 102 that provides relay eNB 104 (and/or other relay eNBs) with access to a core network 106. Additionally, as described, relay eNB 104 can provide relay eNB 108 and/or UE 110 with access to the core network 106 through the donor eNB 102. In addition, it is to be appreciated that relay eNB 108 can comprise the components of relay eNB 104 and provide similar functionality, in one example. In addition, donor eNB 102 can be a macrocell access point, femtocell access point, picocell access point, mobile base station, and/or the like. Relay eNB 104 can similarly be a mobile or stationary relay node that communicates with donor eNB 102 over a wireless or wired backhaul, as described.

Donor eNB 102 comprises an access link component 202 that communicates with one or more downstream nodes, such as relay eNB 104 to provide access to core network 106 and a backhaul link component 204 that communicates with an upstream node, such as one or more components of core network 106, to provide access thereto. Furthermore, donor eNB 102 includes a PGW 306 that communicates with core network 106, as described; PGW 306 can include an addressing component 602 that assigns a local address, such as an IP address, to one or more relay eNBs and a tunnel establishing component 604 that creates a communications tunnel with the relay eNBs. Relay eNB 104 similarly comprises an access link component 206 that communicates with one or more downstream nodes to provide access to core network 106 through the donor eNB 102 and a backhaul link component 208 that communicates with the donor eNB to provide the access to the core network 106. In addition, relay eNB 104 can include an address receiving component 210 that obtains a network address, such as an IP address, from one or more components of the core network 106 and a tunneling component 212 that establishes a communications tunnel with the core network 106 based on the network address.

According to an example, relay eNB 104 can establish communications with donor eNB 102 to receive access to the core network 106. In this example, relay eNB 104 can communicate with the donor eNB 102 over its backhaul link component 208, which can provide a wired or wireless link to the access link component 202 of donor eNB 102. In one example, backhaul link component 208 can communicate with the donor eNB 102 using an air interface (such as an LTE air interface). As described, the backhaul link can be an LTE backhaul link, in one example. Donor eNB 102 can communicate with the core network 106 using its backhaul link component 204 to request access for the relay eNB 104. Core network 106 can include one or more components (not shown) to authenticate/authorize the relay eNB 104, such as an MME, PCRF, and/or the like. In an example, PGW 306 can communicate with one or more components of the core network 106. In addition, donor eNB 102 can comprise a SGW and/or MME (not shown). Addressing component 602 can assign a local IP address to relay eNB 104 to facilitate subsequent communications. Donor eNB 102 can forward the network address communication to the relay eNB 104 over the access link component 202, and backhaul link component 208 can receive the communication. Address receiving component 210 can obtain the address from the communication for subsequent use in communicating with the core network 106 via donor eNB 102. This can support mobility for the relay eNB 104, in one example.

In an example, tunneling component 212 can setup a communications tunnel with the tunnel establishing component 604 using the network address from address receiving component 210. For example, tunneling component 212 can add a header to or otherwise wrap packets before transmitting over the backhaul link component 208 based on the network address; such wrapping can include formatting the packet according to a protocol. In one example, the tunneling component 212 can generate a GTP-U/UDP/IP header for data plane communicates and apply the header to the packet (e.g., insert the header at the beginning of the packet, create a new packet with the header and insert information from the packet into the new packet, etc.). In this regard, tunnel establishing component 604 can receive the packet over the access link component 202. PGW can communicate with one or more components of the core network 106 to retrieve data according to the packet, for example (such as an MME, SGW, and/or the like).

Figure 7:
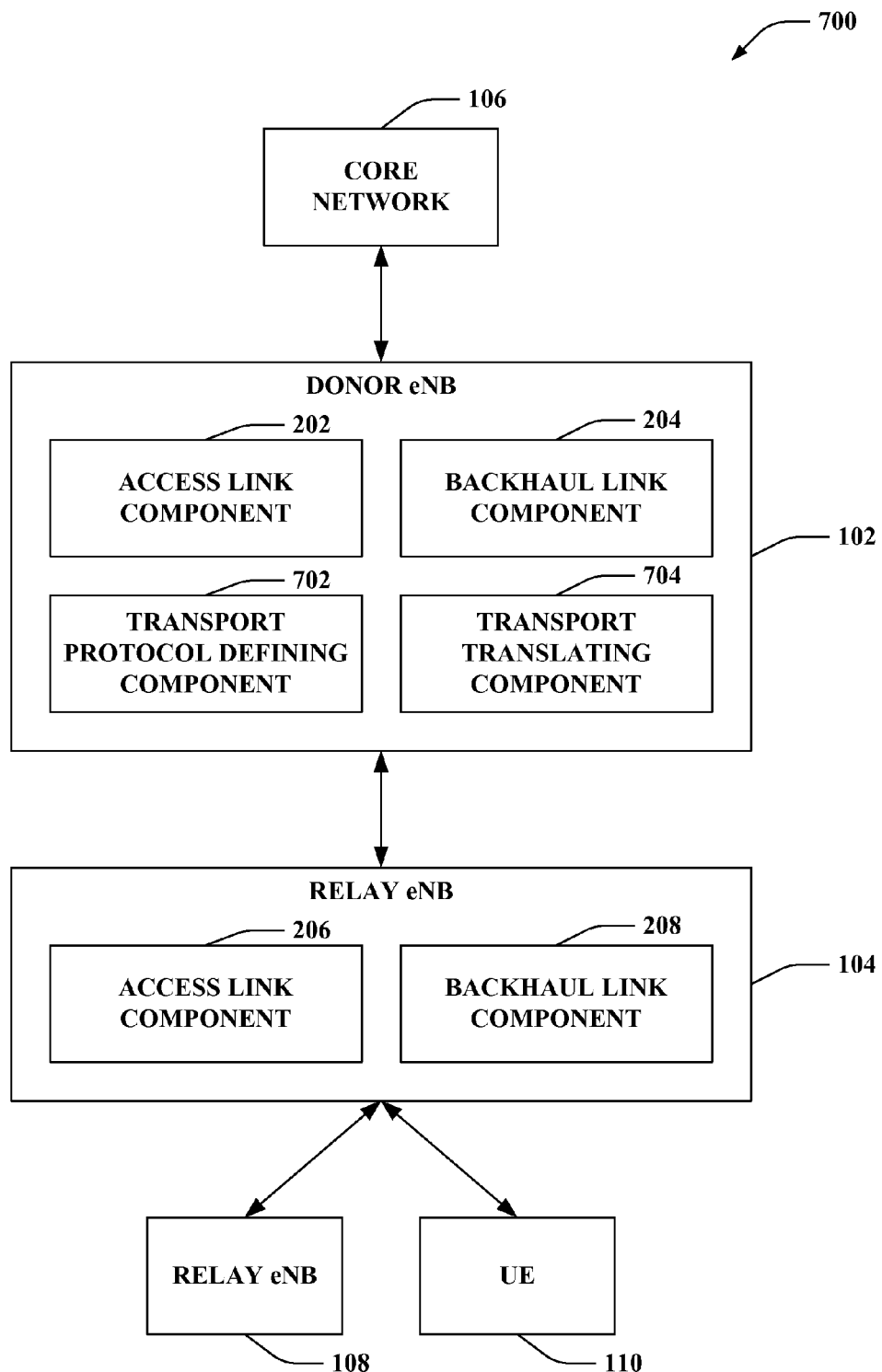
FIG. 7 is an illustration of an example wireless communications system that facilitates communicating with cell relays to provide network access thereto.

Referring to FIG. 7, an example wireless communication system 700 is illustrated for providing cell relay functionality to extend network coverage and/or increase throughput, as described previously. System 700 includes a donor eNB 102 that provides relay eNB 104 (and/or one or more additional relay eNBs) with access to a core network 106. In addition, as described, relay eNB 104 can provide core network access to relay eNB 108 and/or UE 110 through the donor eNB 102. Also, as described, donor eNB 102 can be a macrocell access point, femtocell access point, picocell access point, mobile base station, and/or the like, and relay eNB 104 can similarly be a mobile or stationary relay node that communicates with donor eNB 102 over a wireless or wired backhaul.

Donor eNB 102 comprises an access link component 202 that communicates with one or more downstream nodes, such as relay eNB 104 to provide access to core network 106, a backhaul link component 204 that communicates with an upstream node, such as one or more components of core network 106, to provide access thereto, a transport protocol defining component 702 that establishes a transport layer protocol with relay eNB 104 for forwarding application layer communications from the core network 106, and a transport translating component 704 that decouples application layer data from a transport layer in communications received from the core network 106 and inserts the application layer data into a transport layer according to the transport protocol generated by transport protocol defining component 702 for communicating to the relay eNB 104. Relay eNB 104 similarly comprises an access link component 206 that communicates with one or more downstream nodes to provide access to core network 106 through the donor eNB 102 and a backhaul link component 208 that communicates with the donor eNB 102 to provide the access to the core network 106.

According to an example, relay eNB 104 can establish communications with donor eNB 102 to receive access to the core network 106 (e.g., on behalf of relay eNB 108, UE 110, or otherwise). In this example, relay eNB 104 can communicate with the donor eNB 102 over its backhaul link component 208, which can provide a wired or wireless link to the access link component 202 of donor eNB 102. In one example, backhaul link component 208 can communicate with the donor eNB 102 using an air interface (such as an LTE air interface). As described, the backhaul link can be an LTE backhaul link, in one example. Communications from the core network 106 at the transport layer can be terminated at the donor eNB 102, as described. Thus, donor eNB 102 is responsible for providing data to the appropriate connected relay eNB 104, much like an eNB provides appropriate data to one or more cells. In this regard, relay eNB 104, as described above, is referred to herein as a cell relay in this configuration.

In an example, relay eNB 104 can transmit communications in a control or data plane to donor eNB 102 over the backhaul link component 208 using a compressed transport layer, no transport layer, or some other transport layer configuration that the donor eNB 102 and relay eNB 104 utilize according to a specification, configuration, and/or the like, and the access link component 202 can receive the communications. Transport protocol defining component 702 can generate a packet for communicating the data or control plane communications over a transport protocol appropriate for the core network 106 (such as a stream control transmission protocol (SCTP) for an MME, a GTP-U/UDP/IP for a SGW, and/or the like), and transport translating component 704 can place the communications in the generated packet. Backhaul link component 204 can transmit the packet to the core network 106. In one example, the donor eNB 102 can include an identifier for the relay eNB 104 in the packet (e.g., in an eNB identifier in an S1-AP message over the SCTP for MME, the tunnel endpoint identifier (TEID) of the GTP-U header for SGW, and/or the like) to facilitate identifying a response packet from the core network 106. Thus, backhaul link component 204 can receive a response packet with the indicated identifier in a similar SCTP or GTP-U/UDP/IP packet. Transport protocol defining component 702 can formulate a packet for transmitting over a transport protocol to the relay eNB 104, which can use a compressed form of the SCTP or GTP-U/UDP/IP, in one example, and the transport translating component 704 can convert data received in the response packet to the formulated packet.

In one example, the transport translating component 704 can decouple application layer communications from transport layer communications, and place the application layer portion in the formulated packet so as not to disturb the application layer portion. The application layer protocol can be part of an S1-MME interface for control plane communications, S1-U interface for data plane communications, and/or the like, as described. Access link component 202 can determine a relay eNB 104 to receive the formulated packet; in an example, this can be determined based on an identifier indicated by the core network 106 (e.g., in an S1-AP response message over SCTP, in the TEID of a GTP-U/UDP/IP header, and/or the like), which can be related to an identifier originally sent to the core network 106, as described. Access link component 202 can transmit the formulated packet to relay eNB 104 according to the identifier. Backhaul link component 208 can receive the packet and decode the data according to the transport layer protocol used between relay eNB 104 and donor eNB 102, which can be the compressed SCTP, GTP-U/UDP/IP, or other transport layer, as described. In one example, backhaul link component 208 can determine the backhaul link protocol based at least in part on information in the compressed transport layer, and decode the data according to the determined backhaul protocol. In this regard, the relay eNB 104 and donor eNB 102 can associate the backhaul link protocol with the compressed transport layer. If the data is for relay eNB 108 or UE 110, access link component 206 can forward the data thereto; it is to be appreciated that the access link component 206 can similarly determine such from an additional SCTP or GTP-U/UDP/IP header in the packet.

Figure 8:
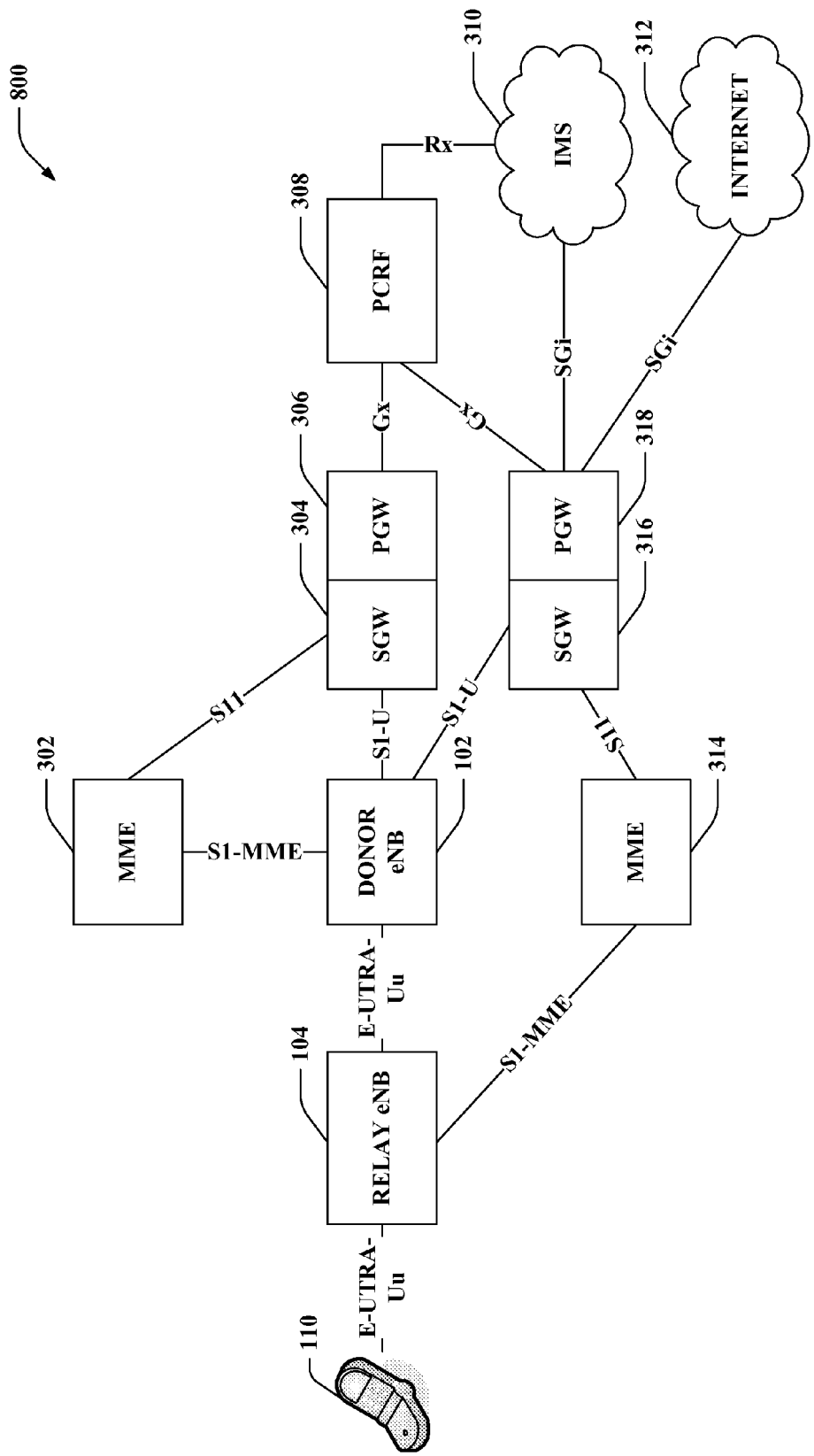
FIG. 8 is an illustration of an example wireless communications system that utilizes cell relays to provide access to a wireless network.

Now turning to FIG. 8, an example wireless communication network 800 that provides cell relay functionality is depicted. Network 800 includes a UE 110 that communicates with a relay eNB 104, as described, to receive access to a wireless network. Relay eNB 104 can communicate with a donor eNB 102 to provide access to a wireless network, and as described, donor eNB 102 can communicate with an MME 302 and/or SGW 304 that relate to the relay eNB 104. SGW 304 can connect to or be coupled with a PGW 306, which provides network access to SGW 304 and/or additional SGWs. PGW 306 can communicate with a PCRF 308 to authenticate/authorize UE 110 to use the network, which can utilize an IMS 310 to provide addressing to the UE 110 and/or relay eNB 104.

According to an example, MME 302 and/or SGW 304 and PGW 306 can be related to donor eNB 102 serving substantially all relay eNBs in the cluster. Donor eNB 102 can also communicate with an SGW 316 and PGW 318 that relate to the UE 110, such that the PGW 318 can assign UE 110 a network address to facilitate tunneling communications thereto through the relay eNB 104, donor eNB 102, and SGW 316. Moreover, for example, SGW 316 can communicate with an MME 314 to facilitate control plane communications to and from the UE 110. It is to be appreciated that MME 302 and MME 314 can be the same MME, in one example. PGW 318 can similarly communicate with a PCRF 308 to authenticate/authorize UE 110, which can communicate with an IMS 310. In addition, PGW 318 can communicate directly with the IMS 310 and/or internet 312.

In an example, UE 110 can communicate with the relay eNB 104 over an E-UTRA-Uu interface, as described, and the relay eNB 104 can communicate with the donor eNB 102 using an E-UTRA-Uu interface or other interface. Donor eNB 102 communicates with the MME 302 using an S1-MME interface and the SGW 304 and PGW 306 over an S1-U interface, as depicted. The transport layers used over the S1-MME and S1-U interfaces are terminated at the donor eNB 102, as described. In this regard, upon receiving communications for the relay eNB 104 from the MME 302 or SGW 304, donor eNB 102 decouples the application layer from the transport layer by defining a new transport layer packet and transmitting the application layer communication to the relay eNB 104 in the new transport layer packet (over the E-UTRA-Uu interface, in one example).

Upon transmitting control plane communications from the relay eNB 104 to the MME 302, donor eNB 102 can indicate an identifier of the relay eNB 104 (e.g., in an S1-AP message), and MME 302 can transmit the identifier in responding communications to the donor eNB 102. When transmitting data plane communications from relay eNB 104 to SGW 304, donor eNB 102 can insert an identifier for the relay eNB 104 in the TEID of a GTP-U header to identify the relay eNB 104, and SGW 304 can transmit the TEID in a responding GTP-U header such that donor eNB 102 can determine the relay eNB 104 to receive the translated packet. These foregoing functionalities can mitigate the need for UDP/IP routing on the backhaul link between various eNBs, for example. In addition, headers can be compressed, in one example, as described. As shown, MME 302 can communicate with SGW 304, and MME 314 to SGW 316, using an S11 interface. PGWs 306 and 318 can communicate with PCRF 308 over a Gx interface. Furthermore, PCRF 308 can communicate with IMS 310 using an Rx interface, and PGW 318 can communicate with IMS 310 and/or the internet 312 using an SGi interface.

Figure 9:
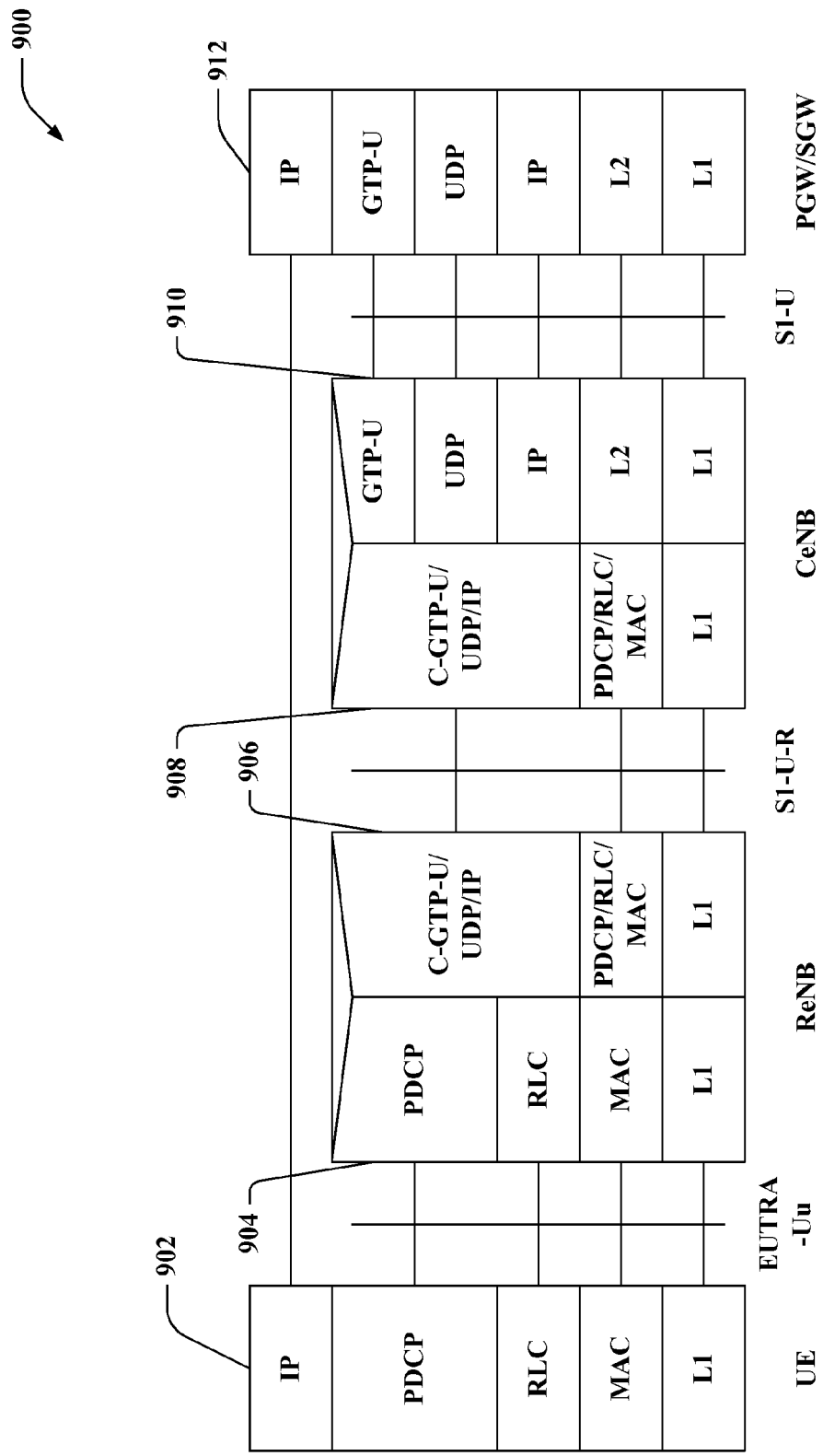
FIG. 9 is an illustration of example protocol stacks that facilitate providing cell relay functionality for data plane communications.

Referring to FIG. 9, example protocol stacks 900 are illustrated that facilitate communicating in a wireless network to provide cell relay functionality for data (e.g., user) plane communications. A UE protocol stack 902 is shown comprising an L1 layer, MAC layer, an RLC layer, a PDCP layer, and an IP layer. An ReNB access link protocol stack 904 is depicted having an L1 layer, MAC layer, RLC layer, and PDCP layer, as well as an ReNB backhaul link protocol stack 906 having an L1 layer, PDCP/RLC/MAC layer, and a C-GTP-U/UDP/IP layer, which can be a compressed layer in one example, to facilitate routing packets on the backhaul (e.g., by populating the TEID with the ReNB address, as described previously). A CeNB access link protocol stack 908 is also shown having an L1 layer, PDCP/RLC/MAC layer, and a C-GTP/UDP/IP layer, as well as a CeNB backhaul link protocol stack 910 having an L1 layer, L2 layer, an IP layer, a UDP layer, and a GTP-U layer to maintain communications with a PGW/SGW using an address assigned by the PGW/SGW. PGW/SGW protocol stack 912 has an L1 layer, L2, layer, IP layer related to an address assigned to the CeNB, UDP layer, GTP-U layer, and another IP layer related to an address assigned to the UE.

According to an example, a UE can communicate with an ReNB to receive access to a PGW/SGW. In this regard, UE can communicate over L1, MAC, RLC, and PDCP layers with the ReNB over using a EUTRA-Uu interface, as shown between protocol stacks 902 and 904. The UE can tunnel IP layer communications through the ReNB and other entities to the PGW/SGW, which assigns an IP address to the UE, as shown between protocol stacks 902 and 912. To facilitate such tunneling, the ReNB communicates with a CeNB over L1, PDCP/RLC/MAC, and C-GTP-U/UDP/IP layers using an S1-U-R interface, as shown between protocol stacks 906 and 908. As described, the S1-U-R interface can be a newly defined interface that utilizes a disparate transport layer than communications between CeNB and PGW/SGW. In this regard, communications between ReNB and CeNB additionally use a compressed version of the GTP-U, UDP/IP headers. Moreover, this compressed header can indicate an address of the rNB in the TEID of the GTP-U header to facilitate return communications, as described, herein. CeNB can decouple the C-GTP-U/UDP/IP header from the transport layer and communicate with the PGW over separate GTP-U, UDP, and IP layers on top of L1 and L2 physical layers over an S1-U interface, as shown between protocol stacks 910 and 912. The same can be true for downlink communications, as described, where CeNB decouples the GTP, UDP, and IP layers from the transport layers, compresses them into a C-GTP-U/UDP/IP header, and transmits over the PDCP/RLC/MAC and L1 layers to the ReNB. CeNB, as described, can use a TEID in the GTP-U header to route the packet to the ReNB. In one example, this mitigates the need for UDP/IP routing on the backhaul, etc.

Figure 10:
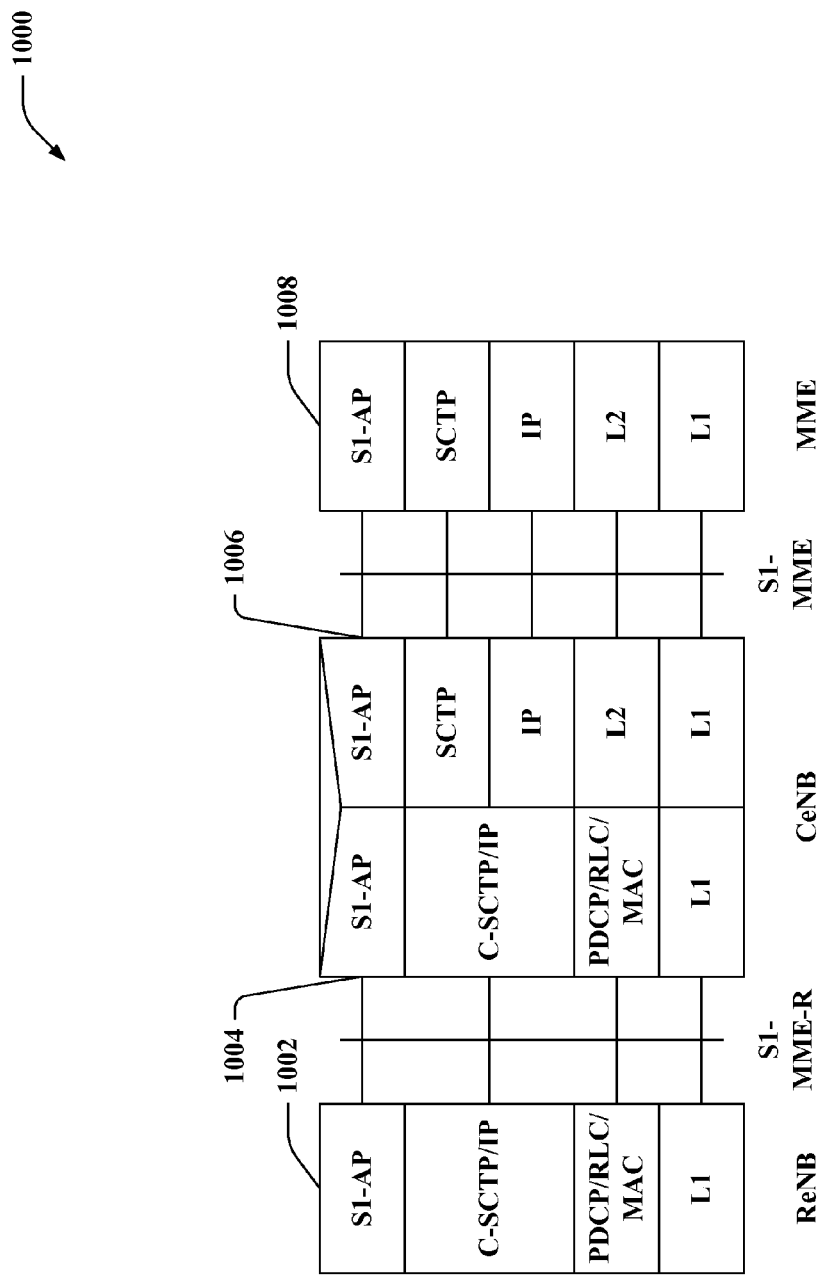
FIG. 10 is an illustration of example protocol stacks that facilitate providing cell relay functionality for control plane communications.

Turning now to FIG. 10, example protocol stacks 1000 are illustrated that facilitate communicating in a wireless network to provide cell relay functionality for control plane communications. An ReNB protocol stack 1002 is shown comprising an L1 layer, a PDCP/RLC/MAC layer, a compressed SCTP (C-SCTP)/IP layer, and an S1-AP layer. A CeNB access link protocol stack 1004 is also shown having an L1 layer, PDCP/RLC/MAC layer, a C-SCTP/IP layer, and a S1-AP layer, as well as a CeNB backhaul link protocol stack 1006 having an L1 layer, L2 layer, IP layer, SCTP layer, and S1-AP layer. MME protocol stack 1008 has an L1 layer, L2, layer, IP layer, SCTP layer, and an S1-AP layer.

According to an example, an ReNB can communicate with a CeNB over an L1 layer, PDCP/RLC/MAC layer, C-SCTP/IP layer, and S1-AP layer using an S1-MME-R interface, as shown between protocol stacks 1002 and 1004, to facilitate control plane communications. As described, the S1-MME-R interface can be a newly defined interface that utilizes a disparate transport layer than communications between CeNB and PGW/SGW. In this regard, communications between ReNB and CeNB additionally use a compressed version of the SCTP and IP headers. Moreover, this compressed header can indicate an eNB identifier of the ReNB in the S1-AP header to facilitate return communications, as described, herein. CeNB can decouple the C-SCTP/IP header from the transport layer and communicate with the MME over separate SCTP and IP layers on top of L1 and L2 physical layers (as well as a S1-AP layer) over an S1-MME interface, as shown between protocol stacks 1006 and 1008. The same can be true for downlink communications, as described, where CeNB decouples the SCTP and IP layers from the transport layers, compresses them into a C-SCTP/IP header, and transmits over the PDCP/RLC/MAC and L1 layers to the ReNB. CeNB, as described, can use an eNB identifier in the S1-AP header to route the packet to the ReNB. In one example, this mitigates the need for UDP/IP routing on the backhaul, etc., in addition, an MME can demultiplex S1-AP messages based on eNB identifiers instead of SCTP associations.

Referring to FIGS. 11-15, methodologies relating to providing relay functionality to extend coverage and/or increase throughput in wireless networks are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 11:
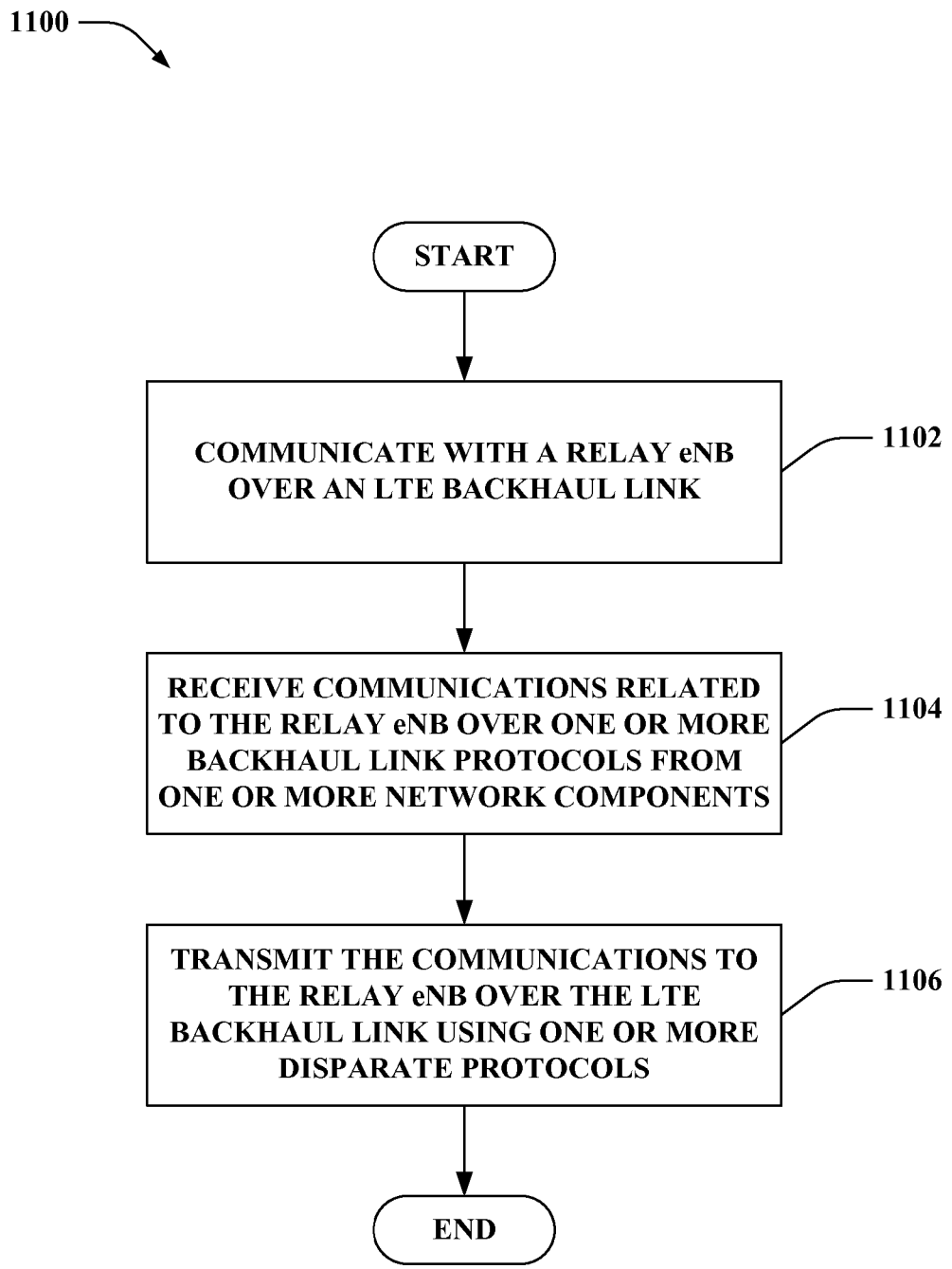
FIG. 11 is an illustration of an example methodology that provides data from a wireless network to one or more relay eNBs.

Turning to FIG. 11, an example methodology 1100 that facilitates communicating with relay eNBs to provide wireless network access thereto is illustrated. At 1102, a relay eNB can be communicated with over an LTE backhaul link. In one example, relay eNB can be communicated with using an air interface (such as E-UTRA-Uu, as described), a wired interface, and/or the like. At 1104, communications related to the relay eNB can be received over one or more backhaul link protocols from one or more network components. For example, the one or more network components can include a SGW, MME, and/or the like, that can further receive the communications from other upstream components. At 1106, the communications can be transmitted to the relay eNB over the LTE backhaul link using one or more disparate protocols. In this regard, at least a portion of the one or more backhaul link protocols can be terminated, and communications can be converted to one or more disparate protocols for transmitting to the relay eNB, as described.

Figure 12:
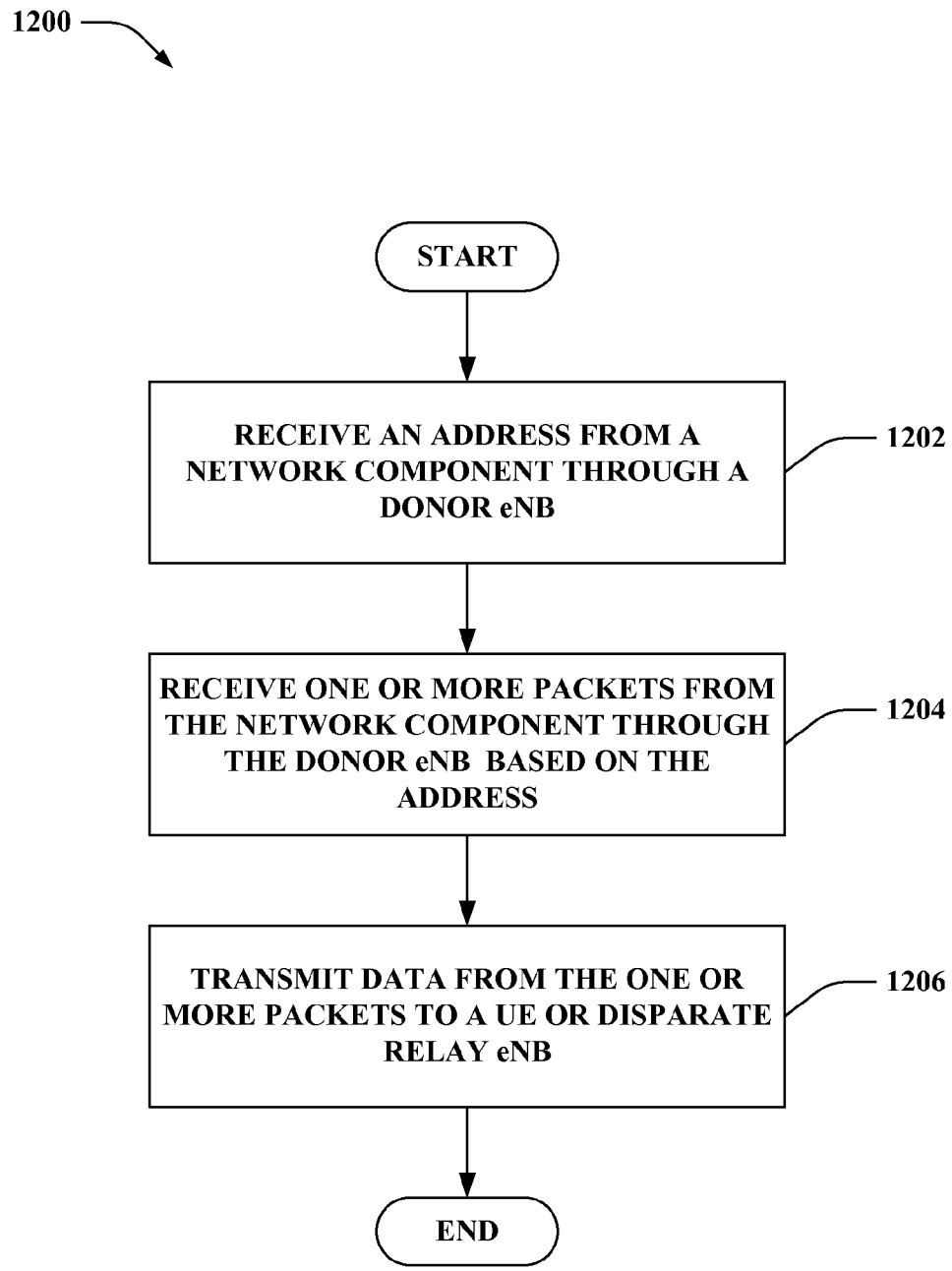
FIG. 12 is an illustration of an example methodology that provides UE relay functionality.

Referring to FIG. 12, an example methodology 1200 is shown that facilitates providing UE relay functionality, as described above. At 1202, an address can be received from a network component through a donor eNB. As described, the address can originate from a PGW and can be provided to the donor eNB by an SGW, in one example. The address, as described, can be used in establishing a communications tunnel with the PGW. In this regard, at 1204, one or more packets can be received from the network component through the donor eNB based on the address. As described, in an example, the packets can be received according to a tunneling protocol (e.g., GTP for data plane communications), over an S1-MME interface for control plane communications, and/or the like. At 1206, data can be transmitted from the one or more packets to a UE or disparate relay eNB.

Figure 13:
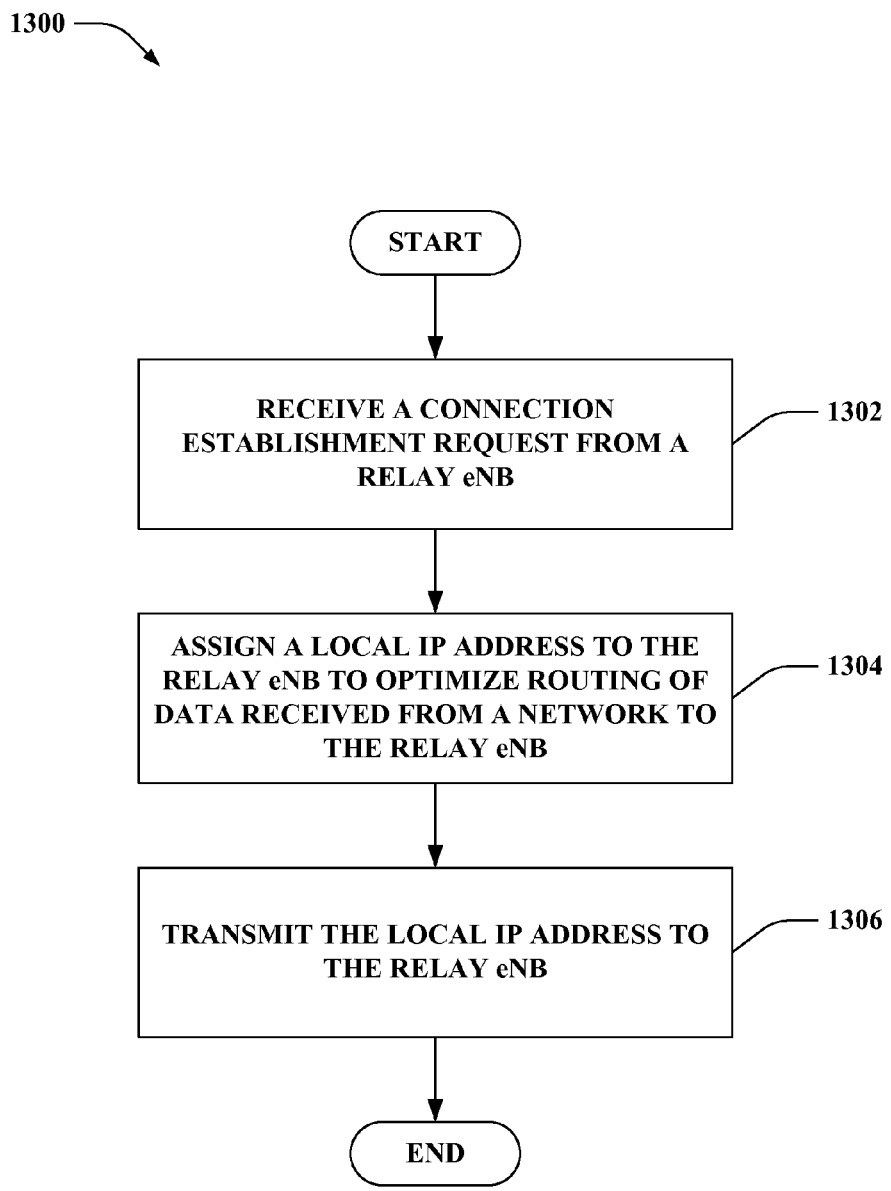
FIG. 13 is an illustration of an example methodology that communicates with UE relays in a local breakout configuration.

Turning to FIG. 13, an example methodology 1300 that facilitates providing a UE relay with an address in a local breakout configuration is illustrated. At 1302, a connection establishment request can be received from a relay eNB. At 1304, a local IP address can be assigned to the relay eNB to optimize routing of data received from a network to the relay eNB. As described, the IP address can be generated at a local PGW and provided to the relay eNB to support tunneling communications according to one or more tunneling protocols. At 1306, the local IP address can be transmitted to the relay eNB.

Figure 14:
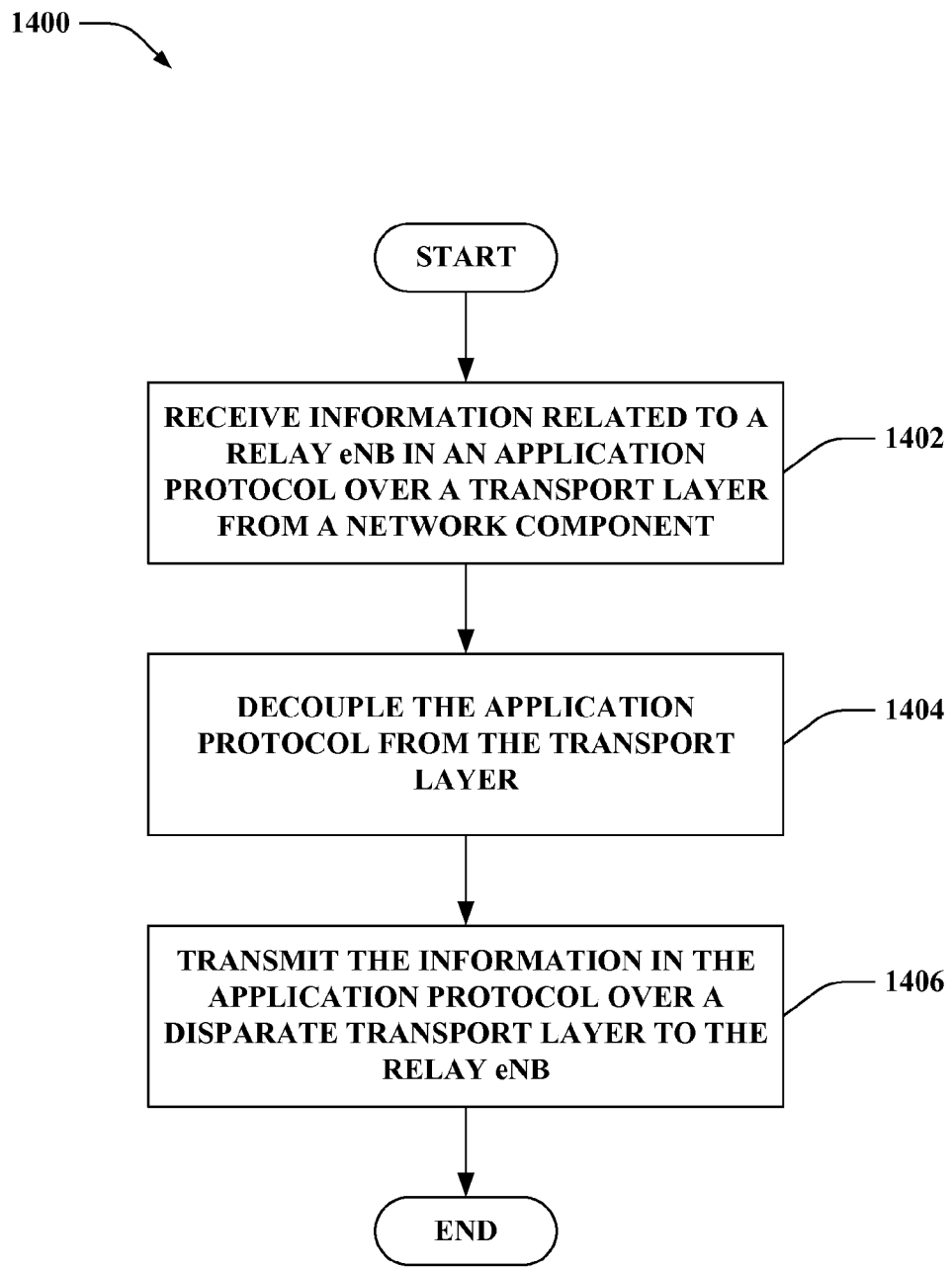
FIG. 14 is an illustration of an example methodology that transmits data from a wireless network to one or more cell relays.

Referring to FIG. 14, an example methodology 1400 is shown that facilitates communicating with cell relays. At 1402, information related to a relay eNB can be received in an application protocol over a transport layer from a network component. As described, the network component can be an upstream component, such as an SGW, PGW, MME, and/or the like. At 1404, the application layer can be decoupled from the transport layer. For example, the application layer can be extracted from the transport layer communications, as described. At 1406, the information in the application protocol can be transmitted over a disparate transport layer to the relay eNB. Thus, the relay eNB is treated as a cell that manages transport layer connections with other devices, such as UEs, disparate relay eNBs, and/or the like, as described.

Figure 15:
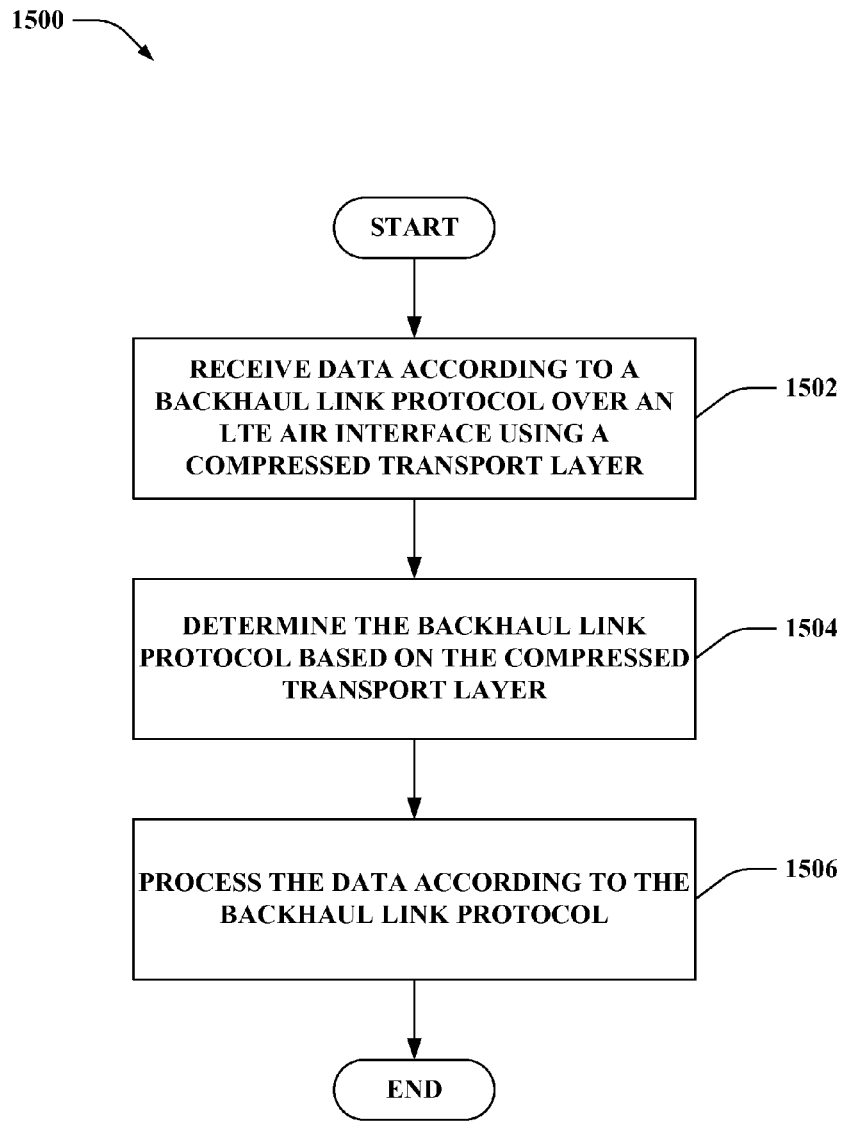
FIG. 15 is an illustration of an example methodology that provides cell relay functionality.

Turning to FIG. 15, an example methodology 1500 that facilitates providing cell relay functionality is illustrated. At 1502, data can be received according to a backhaul link protocol over an LTE air interface using a compressed transport layer. As described, the compressed transport layer can include a number of transport protocols in a single layer, no transport layer, and/or the like. At 1504, the backhaul link protocol can be determined based on the compressed transport layer. In this regard, the compressed transport layer can be defined between devices utilizing the layer for local communications, and the association with a given backhaul link protocol can also be agreed upon between the devices or utilized according to a specification, configuration, and/or the like. At 1506, the data can be processed according to the backhaul link protocol.

It will be appreciated that, in accordance with one or more aspects described herein, inferences can be made regarding determining transport layer protocols and/or other aspects described herein. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 16:
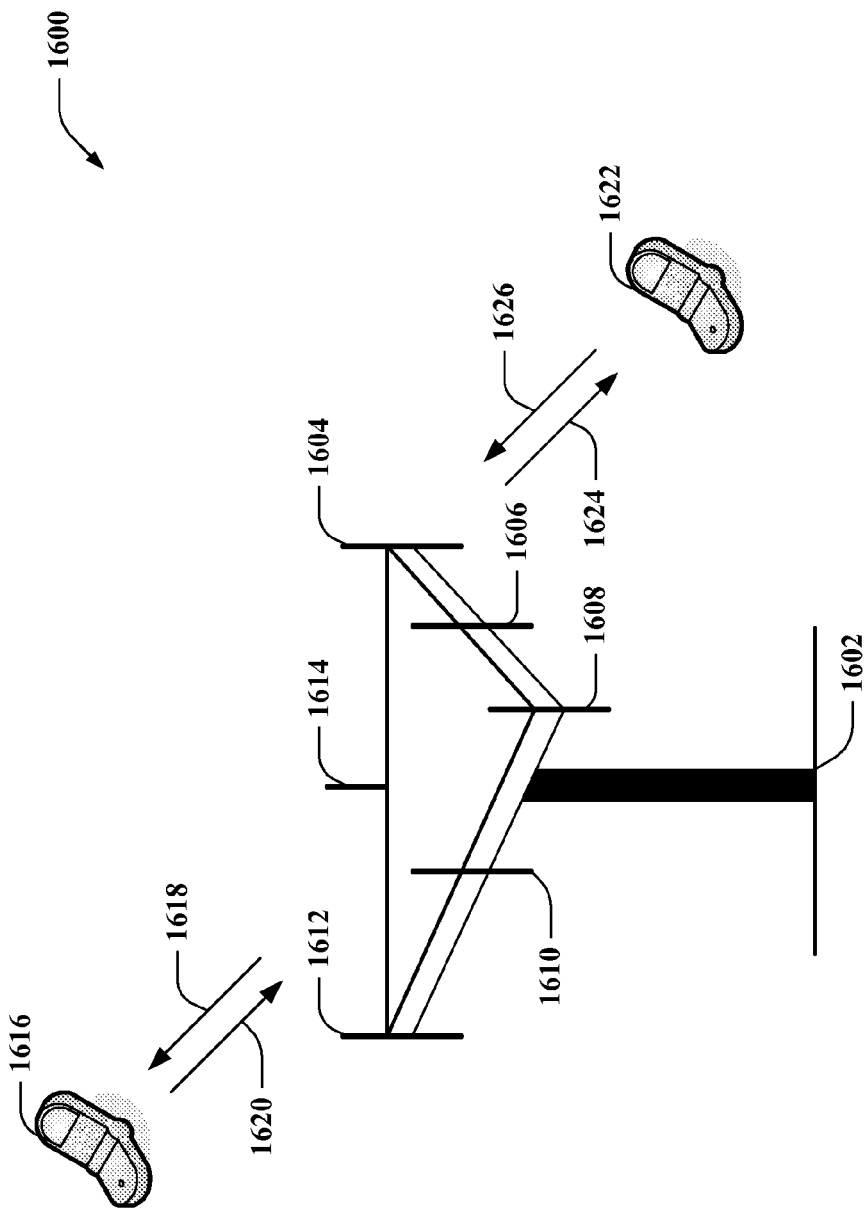
FIG. 16 is an illustration of a wireless communication system in accordance with various aspects set forth herein.

Referring now to FIG. 16, a wireless communication system 1600 is illustrated in accordance with various embodiments presented herein. System 1600 comprises a base station 1602 that can include multiple antenna groups. For example, one antenna group can include antennas 1604 and 1606, another group can comprise antennas 1608 and 1610, and an additional group can include antennas 1612 and 1614. Two antennas are illustrated for each antenna group; however, more or fewer antennas can be utilized for each group. Base station 1602 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1602 can communicate with one or more mobile devices such as mobile device 1616 and mobile device 1622; however, it is to be appreciated that base station 1602 can communicate with substantially any number of mobile devices similar to mobile devices 1616 and 1622. Mobile devices 1616 and 1622 can be, for example, cellular phones, smart phones, laptops, handheld communication devices, handheld computing devices, satellite radios, global positioning systems, PDAs, and/or any other suitable device for communicating over wireless communication system 1600. As depicted, mobile device 1616 is in communication with antennas 1612 and 1614, where antennas 1612 and 1614 transmit information to mobile device 1616 over a forward link 1618 and receive information from mobile device 1616 over a reverse link 1620. Moreover, mobile device 1622 is in communication with antennas 1604 and 1606, where antennas 1604 and 1606 transmit information to mobile device 1622 over a forward link 1624 and receive information from mobile device 1622 over a reverse link 1626. In a frequency division duplex (FDD) system, forward link 1618 can utilize a different frequency band than that used by reverse link 1620, and forward link 1624 can employ a different frequency band than that employed by reverse link 1626, for example. Further, in a time division duplex (TDD) system, forward link 1618 and reverse link 1620 can utilize a common frequency band and forward link 1624 and reverse link 1626 can utilize a common frequency band.

Each group of antennas and/or the area in which they are designated to communicate can be referred to as a sector of base station 1602. For example, antenna groups can be designed to communicate to mobile devices in a sector of the areas covered by base station 1602. In communication over forward links 1618 and 1624, the transmitting antennas of base station 1602 can utilize beamforming to improve signal-to-noise ratio of forward links 1618 and 1624 for mobile devices 1616 and 1622. Also, while base station 1602 utilizes beamforming to transmit to mobile devices 1616 and 1622 scattered randomly through an associated coverage, mobile devices in neighboring cells can be subject to less interference as compared to a base station transmitting through a single antenna to all its mobile devices. Moreover, mobile devices 1616 and 1622 can communicate directly with one another using a peer-to-peer or ad hoc technology (not shown).

According to an example, system 1600 can be a multiple-input multiple-output (MIMO) communication system. Further, system 1600 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1602 can communicate to the mobile devices 1616 and 1622 over the channels, which can be create for various types of data. For example, channels can be created for communicating various types of general communication data, control data (e.g. quality information for other channels, acknowledgement indicators for data received over channels, interference information, reference signals, etc.), and/or the like.

Figure 17:
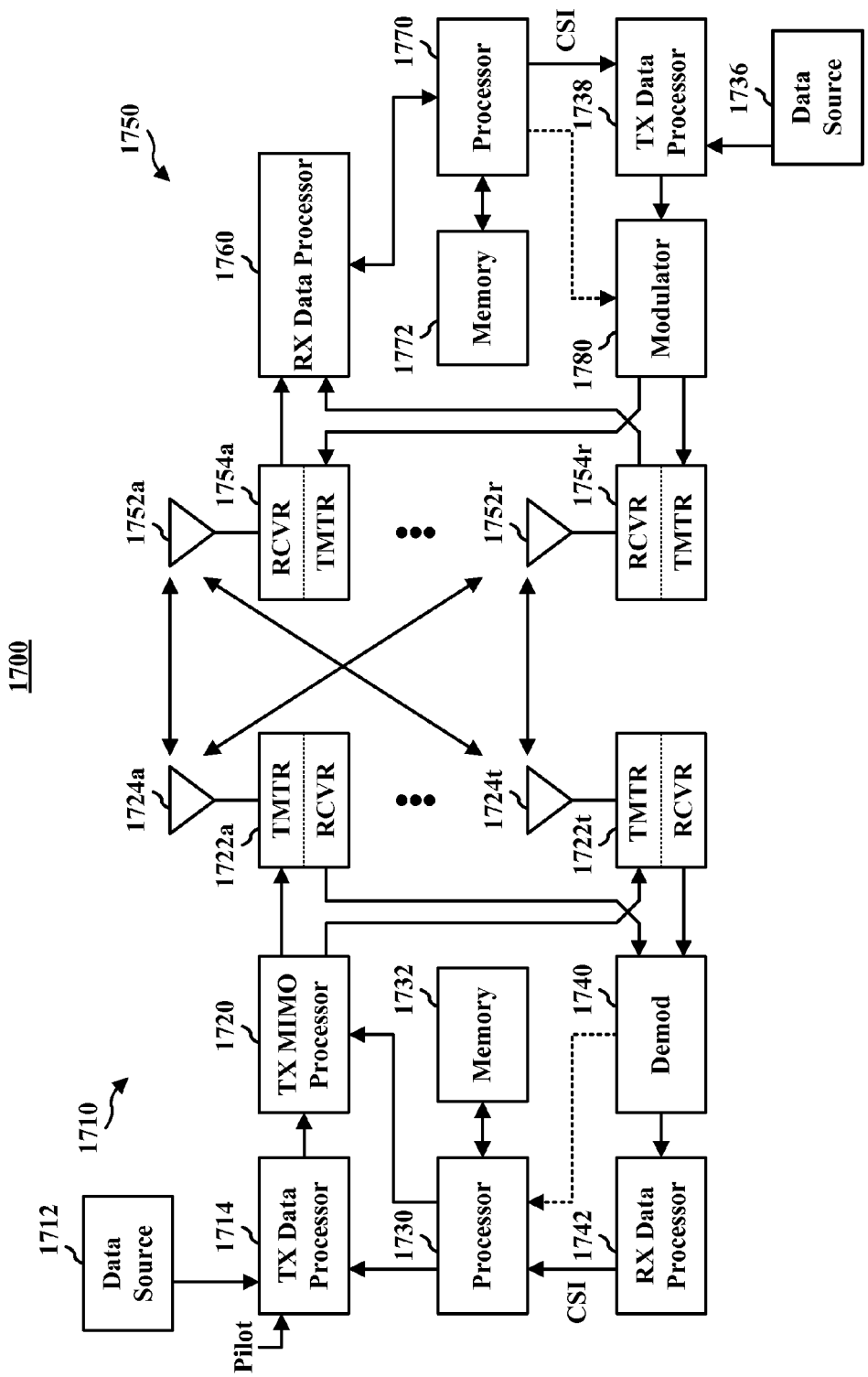
FIG. 17 is an illustration of an example wireless network environment that can be employed in conjunction with the various systems and methods described herein.

FIG. 17 shows an example wireless communication system 1700. The wireless communication system 1700 depicts one base station 1710 and one mobile device 1750 for sake of brevity. However, it is to be appreciated that system 1700 can include more than one base station and/or more than one mobile device, wherein additional base stations and/or mobile devices can be substantially similar or different from example base station 1710 and mobile device 1750 described below. In addition, it is to be appreciated that base station 1710 and/or mobile device 1750 can employ the systems (FIGS. 1-3, 6-8, and 16), protocol stacks (FIGS. 4-5 and 9-10) and/or methods (FIGS. 11-15) described herein to facilitate wireless communication therebetween.

At base station 1710, traffic data for a number of data streams is provided from a data source 1712 to a transmit (TX) data processor 1714. According to an example, each data stream can be transmitted over a respective antenna. TX data processor 1714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1730.

The modulation symbols for the data streams can be provided to a TX MIMO processor 1720, which can further process the modulation symbols (e.g., for OFDM). TX MIMO processor 1720 then provides $N_T$ modulation symbol streams to $N_T$ transmitters (TMTR) 1722a through 1722t. In various aspects, TX MIMO processor 1720 applies beamforming weights to the symbols of the data streams and to the antenna from which the symbol is being transmitted.

Each transmitter 1722 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1722a through 1722t are transmitted from $N_T$ antennas 1724a through 1724t, respectively.

At mobile device 1750, the transmitted modulated signals are received by $N_R$ antennas 1752a through 1752r and the received signal from each antenna 1752 is provided to a respective receiver (RCVR) 1754a through 1754r. Each receiver 1754 conditions (e.g., filters, amplifies, and downconverts) a respective signal, digitizes the conditioned signal to provide samples, and further processes the samples to provide a corresponding "received" symbol stream.

An RX data processor 1760 can receive and process the $N_R$ received symbol streams from $N_R$ receivers 1754 based on a particular receiver processing technique to provide $N_T$ "detected" symbol streams. RX data processor 1760 can demodulate, deinterleave, and decode each detected symbol stream to recover the traffic data for the data stream. The processing by RX data processor 1760 is complementary to that performed by TX MIMO processor 1720 and TX data processor 1714 at base station 1710.

A processor 1770 can periodically determine which preceding matrix to utilize as discussed above. Further, processor 1770 can formulate a reverse link message comprising a matrix index portion and a rank value portion.

The reverse link message can comprise various types of information regarding the communication link and/or the received data stream. The reverse link message can be processed by a TX data processor 1738, which also receives traffic data for a number of data streams from a data source 1736, modulated by a modulator 1780, conditioned by transmitters 1754a through 1754r, and transmitted back to base station 1710.

At base station 1710, the modulated signals from mobile device 1750 are received by antennas 1724, conditioned by receivers 1722, demodulated by a demodulator 1740, and processed by a RX data processor 1742 to extract the reverse link message transmitted by mobile device 1750. Further, processor 1730 can process the extracted message to determine which preceding matrix to use for determining the beamforming weights.

Processors 1730 and 1770 can direct (e.g., control, coordinate, manage, etc.) operation at base station 1710 and mobile device 1750, respectively. Respective processors 1730 and 1770 can be associated with memory 1732 and 1772 that store program codes and data. Processors 1730 and 1770 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 18:
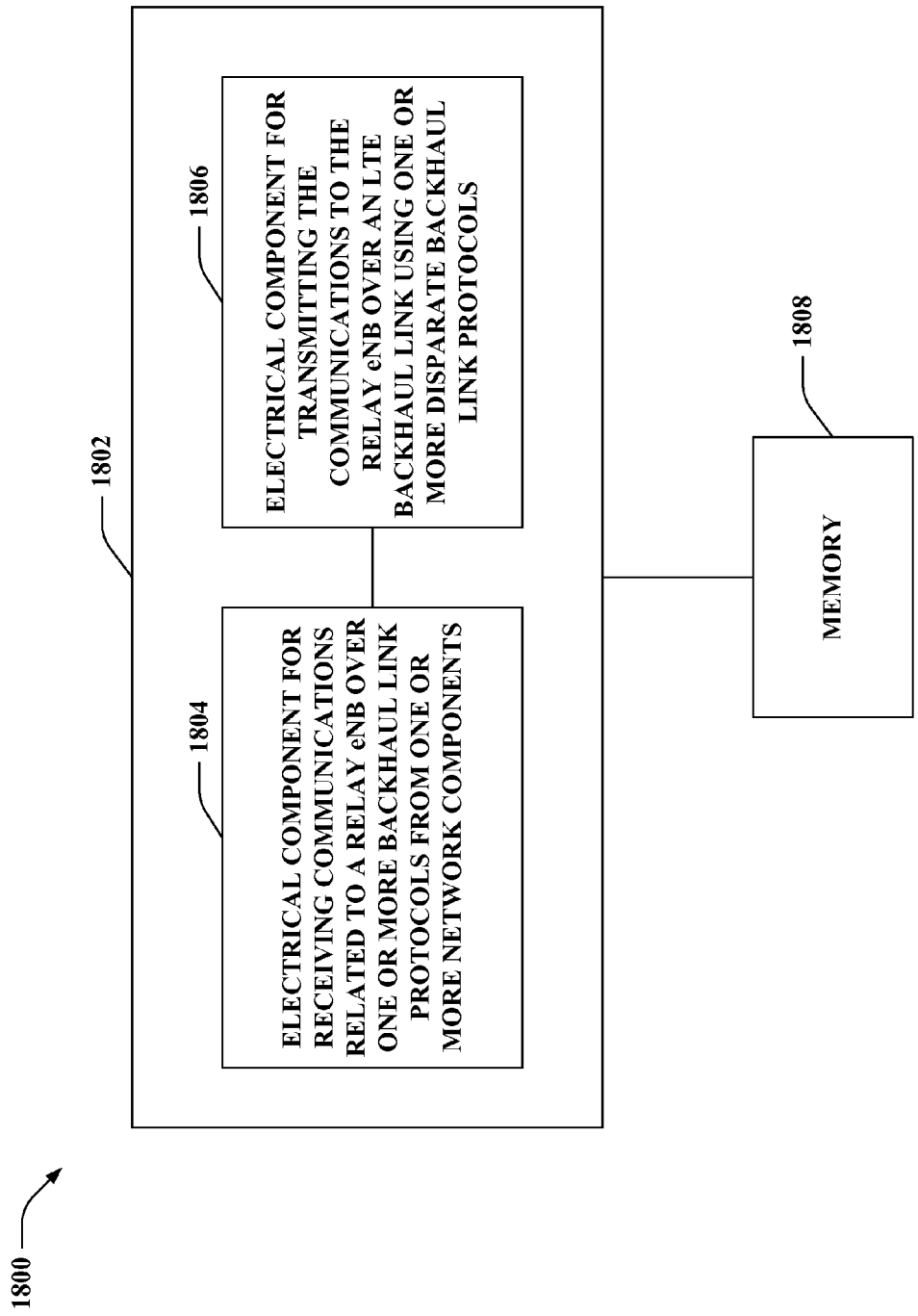
FIG. 18 is an illustration of an example system that facilitates communicating network data to one or more relay eNBs.

With reference to FIG. 18, illustrated is a system 1800 that facilitates providing relays with wireless network access to extend network coverage and/or increase throughput, as described. For example, system 1800 can reside at least partially within a base station, mobile device, etc. It is to be appreciated that system 1800 is represented as including functional blocks, which can be functional blocks that represent functions implemented by a processor, software, or combination thereof (e.g., firmware). System 1800 includes a logical grouping 1802 of electrical components that can act in conjunction. For instance, logical grouping 1802 can include an electrical component for receiving communications related to a relay eNB over one or more backhaul link protocols from one or more network components 1804. In addition, logical grouping 1802 can include an electrical component for transmitting the communications to the relay eNB over an LTE backhaul link using one or more disparate backhaul link protocols 1806. In this regard, the system 1800 can communicate with the relay eNB over one or more defined backhaul link protocols that differ from those utilized by the system 1800 to communicate with a core network. Additionally, system 1800 can include a memory 1808 that retains instructions for executing functions associated with electrical components 1804 and 1806. While shown as being external to memory 1808, it is to be understood that one or more of electrical components 1804 and 1806 can exist within memory 1808.

Figure 19:
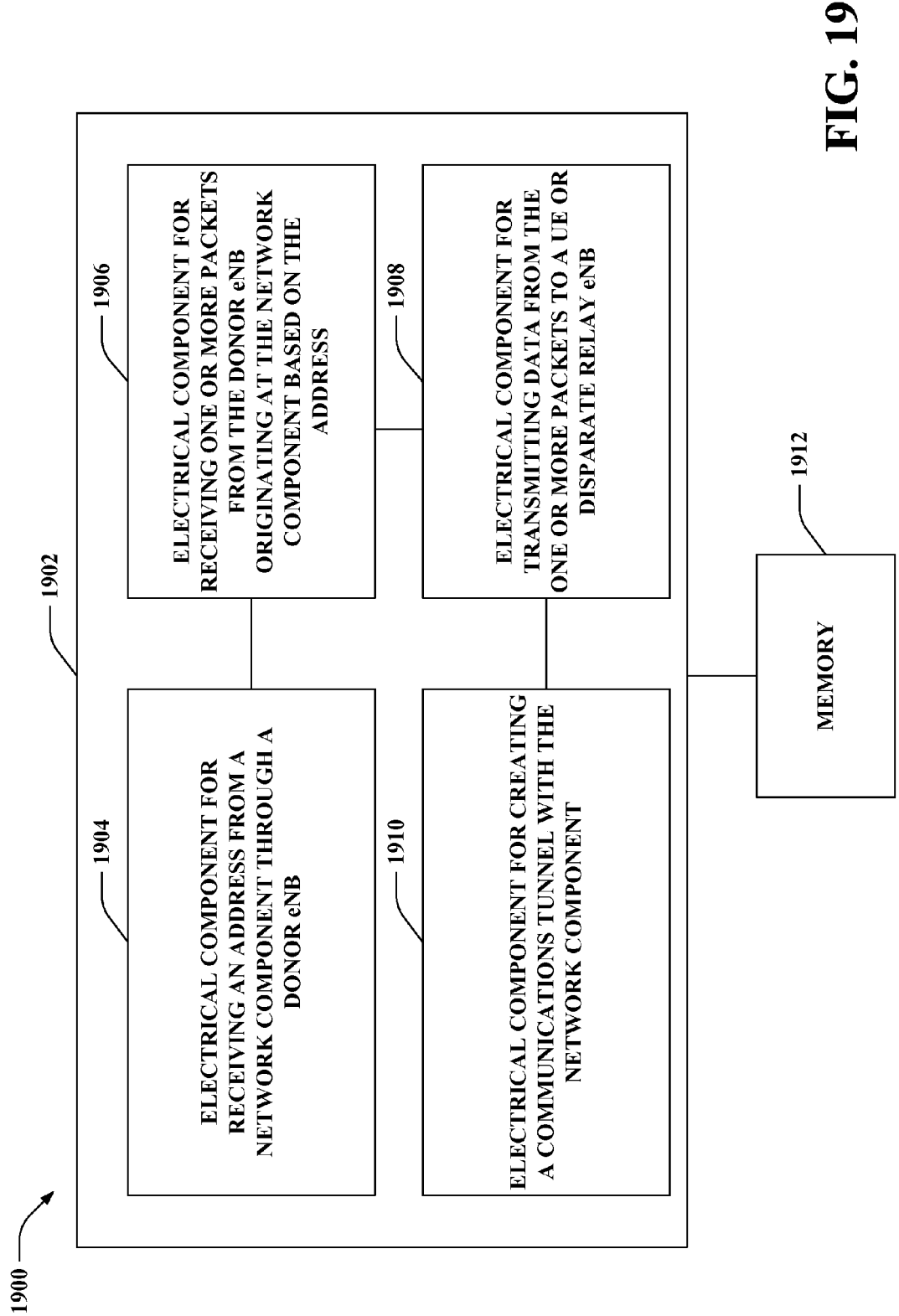
FIG. 19 is an illustration of an example system that facilitates providing UE relay functionality in wireless networks.

With reference to FIG. 19, illustrated is a system 1900 that facilitates implementing a UE relay that provides wireless network access to one or more UEs or relay eNBs. For example, system 1900 can reside at least partially within a base station, mobile device, etc. It is to be appreciated that system 1900 is represented as including functional blocks, which can be functional blocks that represent functions implemented by a processor, software, or combination thereof (e.g., firmware). System 1900 includes a logical grouping 1902 of electrical components that can act in conjunction. For instance, logical grouping 1902 can include an electrical component for receiving an address from a network component through a donor eNB 1904. For example, as described, the address can be generated by a PGW to allow tunneling communications thereto. In this regard, logical grouping 1902 can include an electrical component for receiving one or more packets from the donor eNB originating at the network component based on the address 1906. As described, for example, the one or more packets can be tunneled according to a tunneling protocol, such as GTP or similar protocol, according to an S1-MME interface for control plane communications, and/or the like. The donor eNB can identify the recipient of the packet based on one or more parameters of the tunneling protocol header or wrapper.

Moreover, logical grouping 1902 can include an electrical component for transmitting data from the one or more packets to a UE or disparate relay eNB 1908. Thus, network access is provided to one or more devices, as described. In addition, logical grouping 1902 can include an electrical component for creating a communications tunnel with the network component 1910. As described, the electrical component 1906 can receive the packets over the communication tunnel according to the tunneling protocol. Additionally, system 1900 can include a memory 1912 that retains instructions for executing functions associated with electrical components 1904, 1906, 1908, and 1910. While shown as being external to memory 1912, it is to be understood that one or more of electrical components 1904, 1906, 1908, and 1910 can exist within memory 1912.

Figure 20:
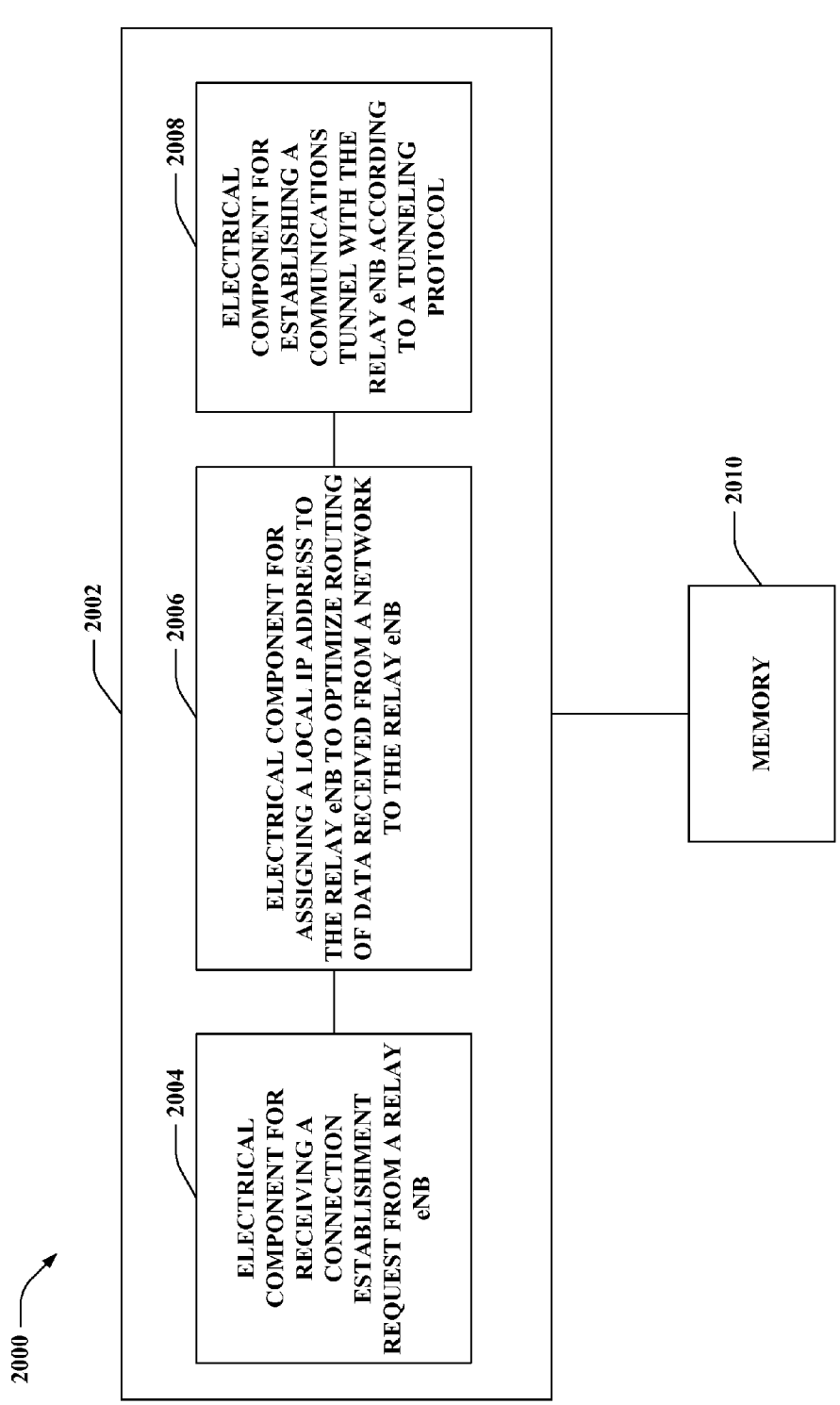
FIG. 20 is an illustration of an example system that communicates with UE relays in a local breakout configuration.

With reference to FIG. 20, illustrated is a system 2000 that facilitates communicating with UE relays in a local breakout configuration. For example, system 2000 can reside at least partially within a base station, mobile device, etc. It is to be appreciated that system 2000 is represented as including functional blocks, which can be functional blocks that represent functions implemented by a processor, software, or combination thereof (e.g., firmware). System 2000 includes a logical grouping 2002 of electrical components that can act in conjunction. For instance, logical grouping 2002 can include an electrical component for receiving a connection establishment request from a relay eNB 2004. Furthermore, logical grouping 2002 can include an electrical component for assigning a local IP address to the relay eNB to optimize routing of data received from a network to the relay eNB 2006.

Moreover, logical grouping 2002 can include an electrical component for establishing a communications tunnel with the relay eNB according to a tunneling protocol 2008. The relay eNB can utilize the tunnel to communicate directly with a co-located PGW, for example, via the system 2000, as described. Additionally, system 2000 can include a memory 2010 that retains instructions for executing functions associated with electrical components 2004, 2006, and 2008. While shown as being external to memory 2010, it is to be understood that one or more of electrical components 2004, 2006, and 2008 can exist within memory 2010.

Figure 21:
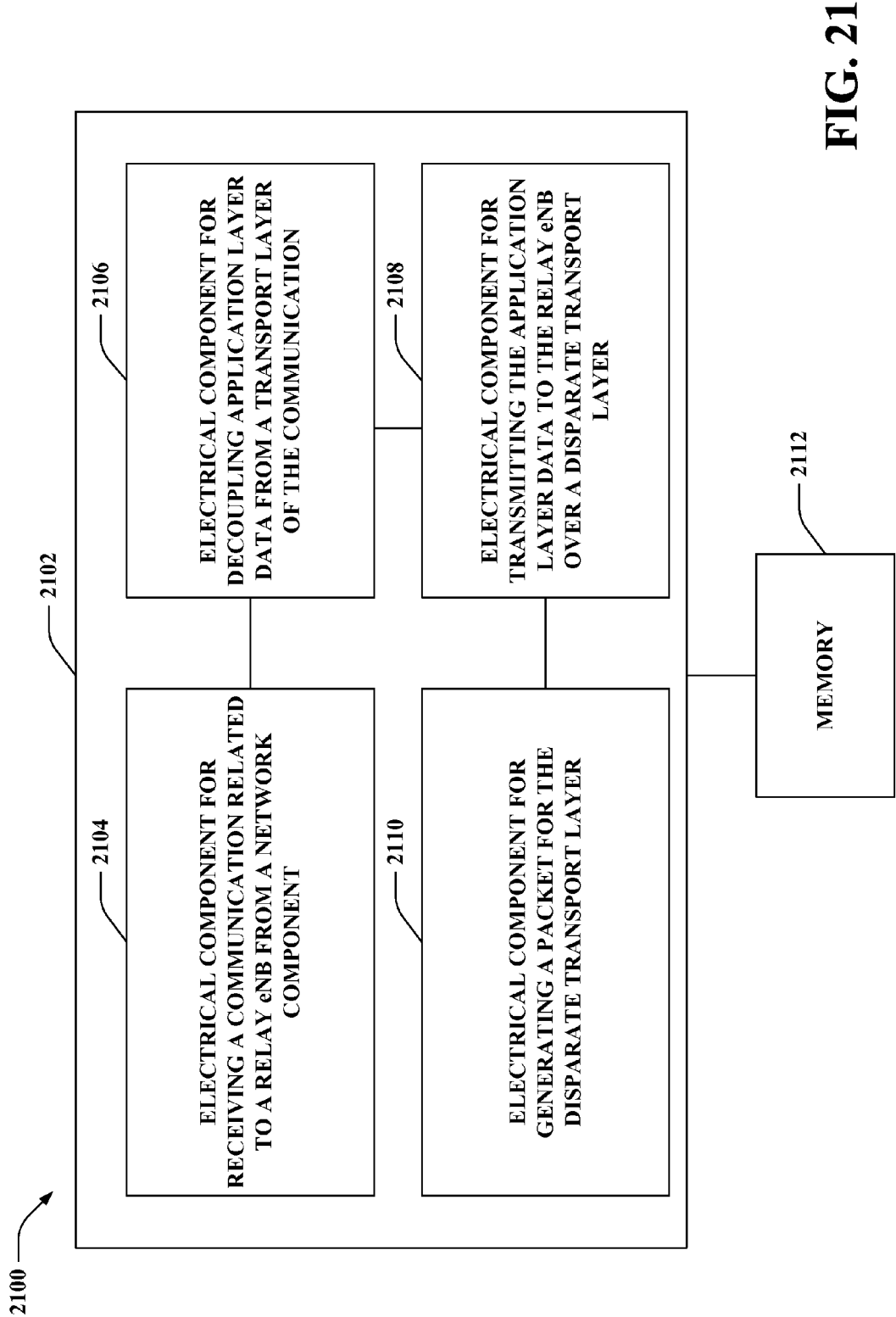
FIG. 21 is an illustration of an example system that facilitates communicating with cell relays in a wireless network.

With reference to FIG. 21, illustrated is a system 2100 that provides network access to cell relays in a wireless network. For example, system 2100 can reside at least partially within a base station, mobile device, etc. It is to be appreciated that system 2100 is represented as including functional blocks, which can be functional blocks that represent functions implemented by a processor, software, or combination thereof (e.g., firmware). System 2100 includes a logical grouping 2102 of electrical components that can act in conjunction. For instance, logical grouping 2102 can include an electrical component for receiving a communication related to a relay eNB from a network component 2104. Furthermore, logical grouping 2102 can include an electrical component for decoupling application layer data from a transport layer of the communication 2106. Thus, as described, the transport layer can terminate at system 2100 such that relay eNBs function like cells of the system 2100.

Moreover, logical grouping 2102 can include an electrical component for transmitting the application layer data to the relay eNB over a disparate transport layer 2108. Furthermore, logical grouping 2102 can include an electrical component for generating a packet for the disparate transport layer 2110. Electrical component 2108 can insert the application layer data into the packet. In this regard, system 2100 translates data received from the network component for receipt by the relay eNB. It is to be appreciated that the electrical component 2108 can transmit the application layer data to the relay eNB based on identifying the relay eNB according to a parameter in the received communication (such as an eNB identifier in an S1-AP message, a TEID in a GTP-U/UDP/IP header, and/or the like), as described. Additionally, system 2100 can include a memory 2112 that retains instructions for executing functions associated with electrical components 2104, 2106, 2108 and 2110. While shown as being external to memory 2112, it is to be understood that one or more of electrical components 2104, 2106, 2108, and 2110 can exist within memory 2112.

Figure 22:
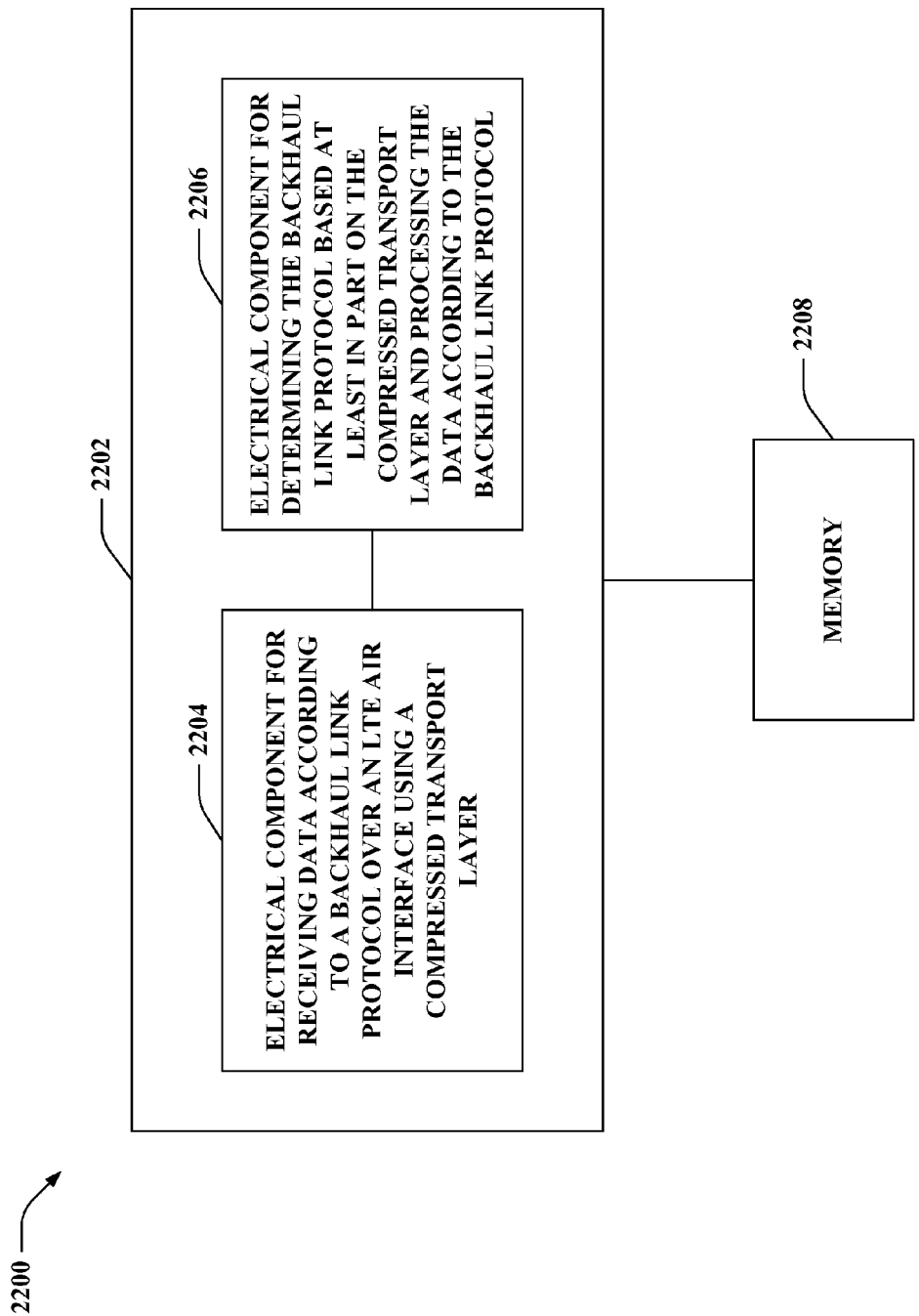
FIG. 22 is an illustration of an example system that provides cell relay functionality in a wireless network.

With reference to FIG. 22, illustrated is a system 2200 that provides cell relay functionality in wireless networks. For example, system 2200 can reside at least partially within a base station, mobile device, etc. It is to be appreciated that system 2200 is represented as including functional blocks, which can be functional blocks that represent functions implemented by a processor, software, or combination thereof (e.g., firmware). System 2200 includes a logical grouping 2202 of electrical components that can act in conjunction. For instance, logical grouping 2202 can include an electrical component for receiving data according to a backhaul link protocol over an LTE air interface using a compressed transport layer 2204. For example, as described, the compressed transport layer can include a number of transport layers compressed into a single layer, a new layer altogether, or no transport layer.

Devices communicating over the backhaul link can utilize the compressed transport layer according to a configuration, specification, and/or the like. In addition, logical grouping 2202 can include an electrical component for determining the backhaul link protocol based at least in part on the compressed transport layer and processing the data according to the backhaul link protocol 2206. As described, devices communicating over the backhaul link can associate the backhaul link protocol with the compressed transport layer, such that detection of the compressed transport layer can facilitate determining the backhaul link protocol to use in decoding data transmitted over the backhaul link. Additionally, system 2200 can include a memory 2208 that retains instructions for executing functions associated with electrical components 2204 and 2206. While shown as being external to memory 2208, it is to be understood that one or more of electrical components 2204 and 2206 can exist within memory 2208.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method performed by a donor eNB, comprising:
   communicating with a relay eNB over an LTE backhaul link;
   receiving communications related to the relay eNB over one or more backhaul link protocols from one or more network components; and
   transmitting the communications to the relay eNB over the LTE backhaul link using one or more disparate protocols,
   wherein the receiving communications related to the relay eNB includes terminating a first transport layer protocol while keeping an application layer intact,
   wherein the transmitting the communications to the relay eNB over the LTE backhaul link includes forwarding the communications to the relay eNB over a second transport layer for the one or more disparate protocols established with the relay eNB, the second transport layer being separate from the first transport layer and having the same transport protocol type as the first transport layer, and
   wherein the donor eNB provides the relay eNB with access to a core network.

2. The method of claim 1, wherein the receiving communications related to the relay eNB includes receiving the communications from the core network.

3. The method of claim 1, wherein the receiving communications related to the relay eNB includes receiving the communications from an access network.

4. The method of claim 1, wherein at least one of the one or more backhaul link protocols relate to a S1-U, S1-MME, or X2 interface.

5. The method of claim 1, further comprising:
   receiving uplink communications from the relay eNB over the LTE backhaul link; and
   transmitting the uplink communications to the one or more network components over the one or more backhaul link protocols.

6. A wireless communications apparatus operating as a donor eNB, comprising:
   at least one processor configured to:
     provide an LTE backhaul link for communicating with a relay eNB;
     obtain communications for the relay eNB from one or more network components over a backhaul link protocol; and
     transmit the communications to the relay eNB over the LTE backhaul link using a disparate backhaul link protocol; and
   a memory coupled to the at least one processor,
   wherein the processor is configured to terminate a transport layer protocol of the backhaul link protocol while keeping an application layer of the backhaul link protocol intact,
   wherein the disparate backhaul link protocol having the same transport protocol type as the transport layer protocol is provided on a transport layer established with the relay eNB, and
   wherein the donor eNB provides the relay eNB with access to a core network.

7. The wireless communications apparatus of claim 6, wherein the at least one processor obtains the communications from the core network.

8. The wireless communications apparatus of claim 6, wherein the at least one processor obtains the communications from an access network.

9. The wireless communications apparatus of claim 6, wherein the backhaul link protocol relates to a S1-U, S1-MME, or X2 interface.

10. The wireless communications apparatus of claim 6, wherein the at least one processor is further configured to:
    obtain uplink communications from the relay eNB over the LTE backhaul link; and
    transmit the uplink communications to the one or more network components using the backhaul link protocol.

11. An apparatus operating as a donor eNB, comprising:
    means for receiving communications related to a relay eNB over one or more backhaul link protocols from one or more network components; and
    means for transmitting the communications to the relay eNB over an LTE backhaul link using one or more disparate backhaul link protocols,
    wherein the means for receiving communications related to the relay eNB terminates a first transport layer protocol while keeping an application layer intact,
    wherein the means for transmitting the communications to the relay eNB over the LTE backhaul link forwards the communications to the relay eNB over a second transport layer for the one or more disparate protocols established with the relay eNB, the second transport layer being separate from the first transport layer and having the same transport protocol type as the first transport layer, and
    wherein the donor eNB provides the relay eNB with access to a core network.

12. The apparatus of claim 11, wherein the means for receiving receives the communications from the core network.

13. The apparatus of claim 11, wherein the means for receiving receives the communications from an access network.

14. The apparatus of claim 11, wherein the one or more backhaul link protocols relate to a S1-U, S1-MME, or X2 interface.

15. The apparatus of claim 11, wherein the means for transmitting communications to the relay eNB receives uplink communications from the relay eNB over the LTE backhaul link, and the means for receiving communications related to the eNB transmits the uplink communications to the one or more network components over the one or more backhaul link protocols.

16. A computer program product of a donor eNB, comprising:
a non-transitory computer-readable medium comprising:
code for causing at least one computer to communicate with a relay eNB over an LTE backhaul link;
code for causing the at least one computer to receive communications related to the relay eNB over one or more backhaul link protocols from one or more network components; and
code for causing the at least one computer to transmit the communications to the relay eNB over the LTE backhaul link using one or more disparate protocols,
wherein the code for causing the at least one computer to receive communications related to the relay eNB includes code for causing the at least one computer to terminate a first transport layer protocol while keeping an application layer intact,
wherein the code for causing the at least one computer to transmit the communications to the relay eNB over the LTE backhaul link includes code for causing the at least one computer to forward the communications to the relay eNB over a second transport layer for the one or more disparate protocols established with the relay eNB, the second transport layer being separate from the first transport layer and having the same transport protocol type as the first transport layer, and
wherein the donor eNB provides the relay eNB with access to a core network.

17. The computer program product of claim 16, wherein the code for causing the at least one computer to receive communications receives the communications from the core network.

18. The computer program product of claim 16, wherein the code for causing the at least one computer to receive communications receives the communications from an access network.

19. The computer program product of claim 16, wherein at least one of the one or more backhaul link protocols relates to a S1-U, S1-MME, or X2 interface.

20. The computer program product of claim 16, wherein the computer-readable medium further comprises:
code for causing the at least one computer to receive uplink communications from the relay eNB over the LTE backhaul link; and
code for causing the at least one computer to transmit the uplink communications to the one or more network components over the one or more backhaul link protocols.

21. An apparatus, comprising:
a backhaul link component that receives communications related to a relay eNB over one or more backhaul link protocols from one or more network components; and
an access link component that transmits the communications to the relay eNB over an LTE backhaul link using one or more disparate backhaul link protocols, wherein the backhaul link component and the access link component are embodied in a donor eNB adapted for one or more of wireless and wired communication,
wherein the backhaul link component terminates a first transport layer protocol while keeping an application layer intact,
wherein the backhaul link component receives the communications using a second transport layer for the one or more disparate protocols used by the access link component to transmit the communications, the second transport layer being separate from the first transport layer and having the same transport protocol type as the first transport layer, and
wherein the donor eNB provides the relay eNB with access to a core network.

22. The apparatus of claim 21, wherein the backhaul link component receives the communications from the core network.

23. The apparatus of claim 21, wherein the backhaul link component receives the communications from an access network.

24. The apparatus of claim 21, wherein the one or more backhaul link protocols relate to a S1-U, S1-MME, or X2 interface.

25. The apparatus of claim 21, wherein the access link component receives uplink communications from the relay eNB over the LTE backhaul link, and the backhaul link component transmits the uplink communications to the one or more network components over the one or more backhaul link protocols.

26. A method, comprising:
receiving at a relay eNB an internet protocol (IP) address from a network component through a donor eNB that is configured to provide the relay eNB with access to a core network;
receiving at the relay eNB one or more packets from the network component through the donor eNB based on the IP address; and
transmitting, from the relay eNB, information from the one or more packets to a UE or a disparate relay eNB.

27. The method of claim 26, further comprising communicating with the donor eNB over an LTE backhaul link.

28. The method of claim 26, wherein the receiving the one or more packets includes receiving the one or more packets according to a general packet radio service (GPRS) tunneling protocol (GTP).

29. The method of claim 28, wherein the receiving the one or more packets according to a GTP includes receiving the one or more packets according to the GTP with the IP address specified in a tunnel endpoint identifier (TEID) of the one or more packets.

30. The method of claim 28, further comprising:
receiving uplink communications from the UE or the disparate relay eNB; and
transmitting one or more disparate packets to relay the uplink communications to the network component through the donor eNB using the GTP based on the IP address.

31. The method of claim 26, wherein the receiving the one or more packets includes receiving the one or more packets over an SI-MME interface.

32. A wireless communications apparatus operating as a relay eNB, comprising:
at least one processor configured to:
obtain an internet protocol (IP) address from a serving gateway via a donor eNB that is configured to provide the relay eNB with access to a core network;

communicate with the serving gateway through the donor eNB to receive one or more packets based at least in part on the IP address; and perform at least one function of the relay eNB, the at least one function including transmitting content from the one or more packets to a UE or a disparate relay eNB; and a memory coupled to the at least one processor.

33. The wireless communications apparatus of claim 32, wherein the at least one processor is further configured to connect to the donor eNB over an LTE backhaul link.

34. The wireless communications apparatus of claim 32, wherein the at least one processor communicates with the serving gateway over a general packet radio service (GPRS) tunneling protocol (GTP), and the one or more packets includes one or more GTP headers.

35. The wireless communications apparatus of claim 34, wherein the one or more GTP headers comprises a tunnel endpoint identifier (TEID) that corresponds to the IP address.

36. The wireless communications apparatus of claim 34, wherein the at least one processor is further configured to:
obtain uplink communications from the UE or the disparate relay eNB; and
transmit at least a portion of the uplink communications to the donor eNB using GTP based at least in part on the IP address.

37. The wireless communications apparatus of claim 32, wherein the at least one processor receives the one or more packets over an S1-MME interface.

38. An apparatus operating as a relay eNB, comprising:
means for receiving an internet protocol (IP) address from a network component through a donor eNB that is configured to provide the relay eNB with access to a core network;
means for receiving one or more packets from the donor eNB originating at the network component based on the IP address; and
means for transmitting information from the one or more packets to a UE or a disparate relay eNB, wherein the means for transmitting information serves as a relay eNB for the UE or the disparate relay eNB.

39. The apparatus of claim 38, further comprising means for creating a communications tunnel with the network component over which the means for receiving receives the one or more packets.

40. The apparatus of claim 39, wherein the means for receiving the one or more packets transmits one or more disparate packets received from the UE or the disparate relay eNB to the network component over the communications tunnel.

41. The apparatus of claim 39, wherein the means for receiving receives the one or more packets according to a general packet radio service (GPRS) tunneling protocol (GTP), and the one or more packets include at least one GTP header.

42. The apparatus of claim 41, wherein the at least one GTP header includes a tunnel endpoint identifier (TEID) that specifies the IP address.

43. The apparatus of claim 41, wherein the at least one GTP header includes a tunnel endpoint identifier (TEID) that specifies a disparate address of the UE or the disparate relay eNB, and the means for transmitting transmits the data to the UE or the disparate relay eNB based at least in part on the disparate address.

44. The apparatus of claim 38, wherein the means for receiving the one or more packets receives the one or more packets from the donor eNB over an LTE backhaul link.

45. The apparatus of claim 38, wherein the means for receiving the one or more packets receives the one or more packets over an S1-MME interface.

46. A computer program product of a relay eNB, comprising:
a non-transitory computer-readable medium comprising:
code for causing at least one computer to receive an internet protocol (IP) address from a network component through a donor eNB that is configured to provide the relay eNB with access to a core network;
code for causing the at least one computer to receive one or more packets from the network component through the donor eNB based on the IP address; and
code for causing the at least one computer to perform at least one function of the relay eNB, the at least one function including transmitting information from the one or more packets to a UE or a disparate relay eNB.

47. The computer program product of claim 46, wherein the computer-readable medium further comprises code for causing the at least one computer to communicate with the donor eNB over an LTE backhaul link.

48. The computer program product of claim 46, wherein the code for causing the at least one computer to receive the one or more packets receives the one or more packets according to a general packet radio service (GPRS) tunneling protocol (GTP).

49. The computer program product of claim 48, wherein the code for causing the at least one computer to receive the one or more packets receives the one or more packets according to the GTP with the IP address specified in a tunnel endpoint identifier (TEID) of the one or more packets.

50. The computer program product of claim 48, wherein the computer-readable medium further comprises code for causing the at least one computer to:
receive uplink communications from the UE or the disparate relay eNB; and
transmit the uplink communications to the network component along with the IP address.

51. The computer program product of claim 46, wherein the code for causing the at least one computer to receive the one or more packets receives the one or more packets over an S1-MME interface.

52. The computer program product of claim 46, wherein the computer-readable medium further comprises code for causing the at least one computer to transmit one or more disparate packets to the network component through the donor eNB using a tunneling protocol based on the IP address.

53. An apparatus, comprising a wireless device that operates as a relay eNB and having:
an address receiving component that obtains an internet protocol (IP) address from a network component through a donor eNB that is configured to provide the relay eNB with access to a core network;
a backhaul link component that receives one or more packets from the donor eNB originating at the network component based on the IP address; and
an access link component that transmits information from the one or more packets to a UE or a disparate relay eNB.

54. The apparatus of claim 53, further comprising a tunneling component that creates a communications tunnel with the network component based on the IP address over which the backhaul link component receives the one or more packets.

55. The apparatus of claim 54, wherein the backhaul link component transmits one or more disparate packets received from the UE or the disparate relay eNB to the network component over the communications tunnel.

56. The apparatus of claim 54, wherein the backhaul link component receives the one or more packets over a general packet radio service (GPRS) tunneling protocol (GTP), and the one or more packets include at least one GTP header.

57. The apparatus of claim 56, wherein the at least one GTP header includes a tunnel endpoint identifier (TEID) that specifies the IP address.

58. The apparatus of claim 56, wherein the at least one GTP header includes a tunnel endpoint identifier (TEID) that specifies a disparate address of the UE or the disparate relay eNB, and the means for transmitting transmits the data to the UE or the disparate relay eNB based at least in part on the disparate address.

59. The apparatus of claim 53, wherein the backhaul link component receives the one or more packets from the donor eNB over an LTE backhaul link.

60. A method, comprising:
receiving a connection establishment request from a relay eNB;
assigning a local internet protocol (IP) address to the relay eNB to optimize routing of data received from a network to the relay eNB; and
transmitting the local IP address to the relay eNB,
wherein the steps of receiving, assigning and transmitting are performed at a donor eNB.

61. The method of claim 60, wherein the receiving the connection establishment request includes receiving the connection establishment request from the relay eNB over an LTE backhaul link.

62. The method of claim 60, further comprising establishing a communications tunnel with the relay eNB according to a tunneling protocol.

63. The method of claim 62, wherein the tunneling protocol is a general packet radio service (GPRS) tunneling protocol (GTP).

64. The method of claim 63, further comprising receiving one or more packets from the relay eNB over the communications tunnel, wherein the one or more packets comprise a GTP header with a tunnel endpoint identifier (TEID) corresponding to the local IP address.

65. A wireless communications apparatus, comprising a donor eNB having:
at least one processor configured to:
obtain a connection establishment request from a relay eNB;
allocate a local internet protocol (IP) address to the relay eNB to optimize routing of data received from a network to the relay eNB; and
provide the local IP address to the relay eNB; and
a memory coupled to the at least one processor.

66. The wireless communications apparatus of claim 65, wherein the at least one processor obtains the connection establishment request from the relay eNB over an LTE backhaul link.

67. The wireless communications apparatus of claim 65, wherein the at least one processor is further configured to establish a communications tunnel with the relay eNB according to a tunneling protocol.

68. The wireless communications apparatus of claim 67, wherein the tunneling protocol is a general packet radio service (GPRS) tunneling protocol (GTP).

69. The wireless communications apparatus of claim 68, wherein the at least one processor is further configured to receive one or more packets from the relay eNB over the communications tunnel, wherein the one or more packets comprise a GTP header with a tunnel endpoint identifier (TEID) corresponding to the local IP address.

70. An apparatus, comprising:
means for receiving a connection establishment request from a relay eNB; and
means for assigning a local internet protocol (IP) address to the relay eNB to optimize routing of data received from a network to the relay eNB, wherein the means for receiving the connection establishment request transmits the local IP address to the relay eNB,
wherein the apparatus functions as a donor eNB.

71. The apparatus of claim 70, wherein the means for receiving the connection establishment request receives the connection establishment request from the relay eNB over an LTE backhaul link.

72. The apparatus of claim 70, further comprising means for establishing a communications tunnel with the relay eNB according to a tunneling protocol.

73. The apparatus of claim 72, wherein the tunneling protocol is a general packet radio service (GPRS) tunneling protocol (GTP).

74. The apparatus of claim 73, wherein the means for receiving the connection establishment request receives one or more packets from the relay eNB over the communications tunnel, wherein the one or more packets comprise a GTP header with a tunnel endpoint identifier (TEID) corresponding to the local IP address.

75. A computer program product of a donor eNB, comprising:
a non-transitory computer-readable medium comprising:
code for causing at least one computer to receive a connection establishment request from a relay eNB; and
code for causing the at least one computer to create a local breakout configuration in response to the connection establishment request, wherein the code for causing the at least one computer to create a local breakout configuration includes:
code for causing the at least one computer to assign a local internet protocol (IP) address to the relay eNB to optimize routing of data received from a network to the relay eNB; and
code for causing the at least one computer to transmit the local IP address to the relay eNB.

76. The computer program product of claim 75, wherein the code for causing the at least one computer to receive the connection establishment request receives the connection establishment request from the relay eNB over an LTE backhaul link.

77. The computer program product of claim 75, wherein the computer-readable medium further comprises code for causing the at least one computer to establish a communications tunnel with the relay eNB according to a tunneling protocol.

78. The computer program product of claim 77, wherein the tunneling protocol is a general packet radio service (GPRS) tunneling protocol (GTP).

79. The computer program product of claim 78, wherein the computer-readable medium further comprises code for causing the at least one computer to receive one or more packets from the relay eNB over the communications tunnel, and the one or more packets comprise a GTP header with a tunnel endpoint identifier (TEID) corresponding to the local IP address.

80. An apparatus, comprising a donor eNB having:
an access link component that receives a connection establishment request from a relay eNB; and an addressing component that assigns a local internet protocol (IP) address to the relay eNB to optimize routing of data received from a network to the relay eNB, wherein the access link component transmits the local IP address to the relay eNB.

81. The apparatus of claim 80, wherein the access link component receives the connection establishment request from the relay eNB over an LTE backhaul link.

82. The apparatus of claim 80, further comprising a tunnel establishing component that creates a communications tunnel with the relay eNB according to a tunneling protocol.

83. The apparatus of claim 82, wherein the tunneling protocol is a general packet radio service (GPRS) tunneling protocol (GTP).

84. The apparatus of claim 83, wherein the access link component receives one or more packets from the relay eNB over the communications tunnel, wherein the one or more packets comprise a GTP header with a tunnel endpoint identifier (TEID) corresponding to the local IP address.

85. A method, comprising:
receiving, at a donor eNB, information related to a relay eNB in one or more application protocols over a transport layer from a network component;
decoupling, at the donor eNB, one or more application protocol layers from the transport layer; and
transmitting, at the donor eNB, the information in the one or more application protocol layers over a disparate transport layer to the relay eNB,
wherein the donor eNB provides the relay eNB with access to a core network.

86. The method of claim 85, wherein the transmitting the information includes transmitting the information to the relay eNB over an LTE backhaul link.

87. The method of claim 85, wherein the receiving the information includes receiving the information from the core network.

88. The method of claim 85, wherein the receiving the information includes receiving the information from an access network.

89. The method of claim 85, wherein the receiving the information includes receiving the information over an S1-U, S1-MME, or X2 interface.

90. A wireless communications apparatus, comprising a donor eNB having:
at least one processor configured to:
receive data related to a relay eNB in an application protocol over a transport layer from a network component;
decouple application protocol layer from the transport layer; and
send the data in the application protocol layer over a disparate transport layer to the relay eNB,
wherein the donor eNB provides the relay eNB with access to a core network; and
a memory coupled to the at least one processor.

91. The wireless communications apparatus of claim 90, wherein the at least one processor sends the data to the relay eNB over an LTE backhaul link.

92. The wireless communications apparatus of claim 90, wherein the network component is in the core network.

93. The wireless communications apparatus of claim 90, wherein the network component is in an access network.

94. The wireless communications apparatus of claim 90, wherein the at least one processor receives the data over an S1-U, S1-MME, or X2 interface.

95. An apparatus, comprising:
means for receiving a communication related to a relay eNB from a network component;
means for decoupling application layer data from a transport layer of the communication; and
means for transmitting the application layer data to the relay eNB over a disparate transport layer,
wherein the apparatus functions as a donor eNB, and
wherein the donor eNB provides the relay eNB with access to a core network.

96. The apparatus of claim 95, further comprising means for generating a packet for the disparate transport layer, wherein the means for transmitting transmits the application layer data in the packet.

97. The apparatus of claim 95, wherein the means for transmitting transmits the application layer data over an LTE backhaul link with the relay eNB.

98. The apparatus of claim 95, wherein the network component is the core network or access network component.

99. The apparatus of claim 95, wherein the means for receiving receives the communication over an S1-U, S1-MME, or X2 interface.

100. A computer program product, comprising:
a non-transitory computer-readable medium comprising:
code for causing at least one computer to perform one or more functions of a donor eNB, wherein the code for causing the at least one computer to perform one or more functions of a donor eNB includes:
code for causing the at least one computer to receive information related to a relay eNB in one or more application protocols over a transport layer from a network component;
code for causing the at least one computer to decouple one or more application protocol layers from the transport layer; and
code for causing the at least one computer to transmit the information in the one or more application protocol layers over a disparate transport layer to the relay eNB,
wherein the donor eNB provides the relay eNB with access to a core network.

101. The computer program product of claim 100, wherein the code for causing the at least one computer to transmit the information transmits the information to the relay eNB over an LTE backhaul link.

102. The computer program product of claim 100, wherein the code for causing the at least one computer to receive the information receives the information from the core network.

103. The computer program product of claim 100, wherein the code for causing the at least one computer to receive the information receives the information from an access network.

104. The computer program product of claim 100, wherein the code for causing the at least one computer to receive the information receives the information over an S1-U, S1-MME, or X2 interface.

105. An apparatus, comprising a donor eNB having:
a backhaul link component that receives a communication related to a relay eNB from a network component;
a transport translating component that decouples application layer data from a transport layer of the communication; and
an access link component that transmits the application layer data to the relay eNB over a disparate transport layer,
wherein the donor eNB provides the relay eNB with access to a core network.

106. The apparatus of claim 105, further comprising a transport protocol defining component that generates a packet for the disparate transport layer, wherein the transport translating component inserts the application layer data in the packet and the access link component transmits the application layer data in the packet to the relay eNB.

107. The apparatus of claim 105, wherein the access link component transmits the application layer data over an LTE backhaul link with the relay eNB.

108. The apparatus of claim 105, wherein the network component is the core network or access network component.

109. The apparatus of claim 105, wherein the backhaul link component receives the communication over an S1-U, S1-MME, or X2 interface.

110. A method, comprising:
receiving data at a relay eNB according to a backhaul link protocol of the relay eNB from a donor eNB over an LTE air interface using a compressed transport layer;
determining the backhaul link protocol at the relay eNB based at least in part on the compressed transport layer; and
processing the data at the relay eNB according to the backhaul link protocol.

111. The method of claim 110, wherein the receiving the data according to the backhaul link protocol includes receiving the data according to an LTE backhaul link protocol.

112. The method of claim 110, further comprising:
receiving uplink data from a UE or disparate relay eNB;
compressing a transport layer related to the uplink data; and
transmitting the uplink data to the donor eNB over the compressed transport layer.

113. A wireless communications apparatus, comprising:
a relay eNB having at least one processor configured to:
obtain data from a donor eNB according to a backhaul link protocol of the relay eNB over an LTE air interface using a compressed transport layer;
discern the backhaul link protocol at the relay eNB based at least in part on the compressed transport layer; and
decode the data according to the backhaul link protocol; and
a memory coupled to the at least one processor.

114. The wireless communications apparatus of claim 113, wherein the at least one processor receives the data according to an LTE backhaul link protocol.

115. The wireless communications apparatus of claim 113, wherein the at least one processor is further configured to:
obtain uplink data from a UE or a disparate relay eNB;
compress a transport layer relayed to the uplink data; and
transmit the uplink data to the donor eNB over the compressed transport layer.

116. An apparatus operating as a relay eNB, comprising:
means for receiving data from a donor eNB according to a backhaul link protocol of the relay eNB over an LTE air interface using a compressed transport layer; and
means for determining the backhaul link protocol at the relay eNB based at least in part on the compressed transport layer and processing the data according to the backhaul link protocol.

117. The apparatus of claim 116, wherein the means for receiving the data receives the data according to an LTE backhaul link protocol.

118. The apparatus of claim 116, wherein the means for determining the backhaul link protocol further receives uplink data from a UE, and the means for receiving data from the donor eNB further compresses a transport layer of the uplink data upon transmitting the uplink data to the donor eNB over the backhaul link protocol.

119. A computer program product of a relay eNB, comprising:
a non-transitory computer-readable medium comprising:
code for causing at least one computer to perform one or more functions of a donor eNB, wherein the code for causing the at least one computer to perform one or more functions of a donor eNB includes:
code for causing the at least one computer to receive data from a donor eNB according to a backhaul link protocol of the relay eNB over an LTE air interface using a compressed transport layer;
code for causing the at least one computer to determine the backhaul link protocol at the relay eNB based at least in part on the compressed transport layer; and
code for causing the at least one computer to process the data according to the backhaul link protocol.

120. The computer program product of claim 119, wherein the code for causing the at least one computer to receive the data receives the data according to an LTE backhaul link protocol.

121. The computer program product of claim 119, wherein the computer-readable medium further comprises:
code for causing the at least one computer to receive uplink data from a UE or disparate relay eNB;
code for causing the at least one computer to compress a transport layer related to the uplink data; and
code for causing the at least one computer to transmit the uplink data to the donor eNB over the compressed transport layer.

122. An apparatus, comprising a relay eNB having:
an access link component that receives data from a donor eNB according to a backhaul link protocol of the relay eNB over an LTE air interface using a compressed transport layer; and
a backhaul link component that determines the backhaul link protocol at the relay eNB based at least in part on the compressed transport layer and decodes the data according to the backhaul link protocol.

123. The apparatus of claim 122, wherein the access link component receives the data according to an LTE backhaul link protocol.

124. The apparatus of claim 122, wherein the access link component further receives uplink data from a UE, and the backhaul link component further compresses a transport layer of the uplink data upon transmitting the uplink data to the donor eNB over the backhaul link protocol.

* * * * *